United States Patent
Tarumi et al.

(10) Patent No.: US 6,419,999 B1
(45) Date of Patent: Jul. 16, 2002

(54) LIQUID-CRYSTALLINE MEDIUM AND LIQUID-CRYSTAL DISPLAY CONTAINING SAME

(75) Inventors: Kazuaki Tarumi, Seeheim; Marcus Reuter, Darmstadt; Eike Poetsch, Mühltal; Michael Schwarz, Weiterstadt; Volker Reiffenrath, Rossdorf, all of (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/394,877

(22) Filed: Sep. 13, 1999

(30) Foreign Application Priority Data

Sep. 12, 1998 (DE) .......................... 198 41 833
Nov. 9, 1998 (DE) .......................... 198 51 513

(51) Int. Cl.$^7$ .................. C09K 19/30; C09K 19/20; C09K 19/12
(52) U.S. Cl. .............. 428/1.1; 252/299.63; 252/299.66; 252/299.67
(58) Field of Search ............ 252/299.63, 299.66, 252/299.67; 428/1.1

(56) References Cited

U.S. PATENT DOCUMENTS

| | | | |
|---|---|---|---|
| 4,398,803 A | | 8/1983 | Pohl et al. .................. 350/334 |
| 5,560,865 A | * | 10/1996 | Nakagawa et al. ..... 252/299.01 |
| 5,653,912 A | * | 8/1997 | Nakagawa et al. ..... 252/299.01 |
| 5,683,624 A | * | 11/1997 | Sekiguchi et al. ...... 252/299.61 |
| 5,776,366 A | * | 7/1998 | Tomi et al. ............. 252/299.63 |
| 5,976,404 A | * | 11/1999 | Hirschmann et al. .. 252/299.01 |
| 5,976,407 A | * | 11/1999 | Tarumi et al. ......... 252/299.01 |
| 5,997,767 A | * | 12/1999 | Hirschmann et al. .. 252/299.63 |
| 6,028,655 A | * | 2/2000 | Weber et al. ................ 349/182 |
| 6,080,451 A | * | 6/2000 | Hirschmann et al. ........ 428/1.1 |

FOREIGN PATENT DOCUMENTS

| | | | |
|---|---|---|---|
| JP | 11-92762 | * | 4/1999 |
| JP | 2001-294862 | * | 10/2001 |

OTHER PUBLICATIONS

Japan paten abstract JP 11092762, 1999.*

* cited by examiner

Primary Examiner—Shean C. Wu
(74) Attorney, Agent, or Firm—Millen, White, Zelano & Branigan, P.C.

(57) ABSTRACT

Liquid-crystalline media comprising one or more compounds of each of the formulae I and II

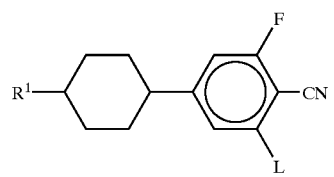

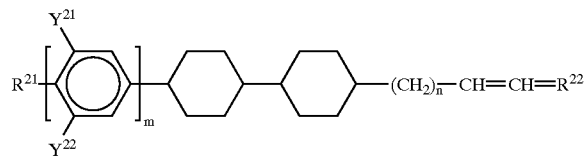

in which $R^1$, $R^{21}$, $R^{22}$, L, $Y^{21}$, $Y^{22}$, n and m are as defined herein, and liquid-crystal displays containing same, have low frequency dependence of the dielectric properties in particular at low temperatures.

48 Claims, 3 Drawing Sheets

LIQUID-CRYSTALLINE MEDIUM AND LIQUID-CRYSTAL DISPLAY CONTAINING SAME

The invention relates to liquid-crystalline media, in particular for use in liquid-crystal displays. It furthermore relates to liquid-crystal displays containing these liquid-crystalline media, in particular liquid-crystal displays having low addressing voltages. These liquid-crystal displays are operated in TN (twisted nematic) or STN mode. The addressing takes place directly or by time multiplexing at low multiplex ratios. The TN displays are preferably operated at the first Gooch and Tarry transmission minimum. The TN and STN displays are suitable, inter alia, for outdoor applications and, owing to their suitability for common applications, are also known as "common-use displays".

Liquid crystals are principally used as dielectrics in display devices since the optical properties of these materials can be modified in a targeted manner by the action of an electric field.

Electro-optical devices based on liquid crystals are extremely well known to the person skilled in the art and can be based on various effects. Such devices are, for example, cells having dynamic scattering, DAP or ECB cells (DAP= deformation of lined phases; ECB=electrically controlled birefringence), guest/host cells, TN cells having a twisted nematic structure, STN (supertwisted nematic) cells, SPE (superbirefringence effect) cells, OMI (optical mode interference) cells, IPS (in-plane switching) cells or cells having a cholesteric-nematic phase conversion.

The most common display devices are TN cells. These are based on the Schadt-Helfrich effect and have a twisted nematic structure. Industrial use of such TN liquid-crystal displays requires liquid-crystalline materials which satisfy a multiplicity of conditions.

In order to achieve a long service life, the liquid-crystal materials must have, for example, good chemical and thermal stability and good stability to the action of electric fields and electromagnetic radiation.

In addition, the liquid-crystal materials must have a suitable mesophase at normal operating temperatures, i.e. in the broadest possible range above and below room temperature (20° C.). If they are intended to be suitable for outdoor applications, for example in automobiles or in avionics, they should have, in particular, good low-temperature behavior, which means, for example, that crystallization should not occur at low temperatures of −20° C. In addition, the mixtures should have clearing points $T_{N,I}$ above 55° C.

Operation of TN liquid-crystal displays at the first Gooch and Tarry transmission minimum favorably affects the size of the viewing angle at which the display can be viewed (U.S. Pat. No. 4,398,803). In this case, the optical anisotropy $\Delta n$ of the liquid-crystal mixtures is selected so that the optical path difference (=product of the cell thickness d of the TN liquid-crystal display and the optical anisotropy $\Delta n$ of the liquid-crystal mixture) is about 0.5 $\mu$m. For such applications, optical anisotropies $\Delta n$ of from about 0.06 to 0.12 are preferred.

However, TN liquid-crystal displays can also be operated at a higher Gooch and Tarry transmission minimum. If, for example, they are operated at the second transmission minimum, the optical path difference is from about 1.0 $\mu$m to 1.1 $\mu$m. For such applications, liquid-crystal mixtures having optical anisotropies $\Delta n$ of from about 0.10 to 0.21 are preferred. In general, TN liquid-crystal displays operated at the second or higher transmission minimum have greater viewing-angle dependencies than TN liquid-crystal displays operated at the first transmission minimum. On the other hand, they are usually characterized by being easier to produce and thus by better production yields.

In addition, the liquid-crystal materials should have the lowest possible rotational and flow viscosities. Low rotational viscosities $\gamma_1$ favor, in particular, short response times. By contrast, low flow viscosities $\mu_{20}$ simplify the filling of TN liquid-crystal displays.

The liquid-crystal materials should give the lowest possible threshold voltages $V_{(10,0,20)}$ (also known as $V_{10}$ (0°, 20° C.), since the TN liquid-crystal display can then be operated at low operating voltages $V_{op}$, which can be obtained, for example, by batteries. The three indices in the threshold voltages $V_{(10,0,20)}$ relate to the relative contrast (here 10%), the viewing angle (here $\theta$=0 degrees at $\Phi$=0 degrees) and the temperature (here 20° C.). The threshold voltage $V_{(10,0,20)}$ of a liquid-crystal mixture is influenced principally by the magnitude of the dielectric anisotropy $\Delta\in$, where the threshold voltage is lower the higher the dielectric anisotropy of the mixture. For example, mixtures having positive dielectric anisotropy $\Delta\in$ are used in common-use applications. These mixtures preferably have dielectric anisotropies $\Delta\in$ of from 1.5 to 39.

The liquid-crystal materials should give high contrast. In order that the TN liquid-crystal display can easily be read even at various viewing angles, the viewing-angle dependence of the contrast should in addition be as low as possible.

The liquid-crystal materials themselves, i.e. with the exception of any added dichroic dyes, must not absorb in the visible spectral region, i.e. they must be colorless, in order that the TN liquid-crystal displays have good contrast for black/white images and achieve the longest possible service life.

The liquid-crystal materials should have low electroconductivity, since otherwise a considerable part of the addressing voltage is lost due to conduction processes.

High-information TN liquid-crystal displays require liquid-crystalline substances having a steep electro-optical characteristic line which are characterized by a large ratio $K_{33}/K_{11}$ of the elastic constants $K_{33}$ (bend) and $K_{11}$ (splay). STN displays, in particular, are used here. By contrast, such requirements are not made of liquid-crystal materials intended for use in TN liquid-crystal displays addressed at low multiplex ratios. By contrast, the use of substances having flatter electro-optical characteristic lines favors the display of grey shades.

Since no liquid-crystalline substance which satisfies all the demands simultaneously is known hitherto, liquid-crystal mixtures of from 5 to 30 compounds are generally prepared in order to obtain materials having suitable properties. The liquid-crystal materials must also be readily miscible with one another.

A major problem in the liquid-crystal displays of the prior art is the temperature dependence of the characteristic voltages, such as the threshold voltage, and thus the operating voltage. The liquid-crystal materials should have the lowest possible temperature dependence of the threshold voltage $d[V_{10,0,T}/V_{(10,0,20)}]/dT$ (or of the dielectric anisotropy $d\Delta\in(T)/dT$). This has the advantage that temperature compensation of the addressing voltage can be omitted entirely or at least partly.

A known liquid-crystal mixture from the prior art which can be employed in TN liquid-crystal displays for common-use applications is, for example, E7 (Merck Ltd, Poole, England). This mixture comprises cyanobiphenyls and -terphenyls and has the following properties:

Clearing point $T_{N,I}$: 60.5° C.
Optical anisotropy Δn: 0.225
Viscosity: 39 cSt
Threshold voltage $V_{(10,0,20)}$: 1.5 V In spite of an acceptable clearing point $T_{N,I}$ and relatively good viscosity, mixtures of this type are unsuitable for many applications, for example owing to their excessively high optical anisotropies Δn and/or excessively high threshold voltages $V_{(10,0,20)}$.

In order, for example, to reduce the threshold voltage $V_{(10,0,20)}$, highly polar nematic compounds having a terminal cyano group are added to the liquid-crystal mixtures known hitherto. However, the effective dipole moment of these compounds is reduced to a significant extent by a varying degree of antiparallel association of these molecules, meaning that a relatively large amount of polar compounds must be added. This in turn causes various disadvantages, for example unfavorable elastic properties and high viscosities of the liquid-crystal phases.

Addition of 4-cyano-3-fluorophenyl 4-alkyl-benzoates as highly polar components to ZLI-1957/5 (commercially available mixture from Merck KGAA, Darmstadt, comprising phenylcyclohexane, cyclohexylbiphenyl and biscyclohexylbiphenyl compounds and phenyl 4-cyclohexylbenzoate) allows the threshold voltage $V_{(10,0,20)}$ to be reduced (H. Schadt, S. M. Kelly, J. Chem. Phys. 81(3), 1514–15 (1984)), which is explained by a lower degree of association of the added compounds. However, these liquid-crystal phases likewise do not satisfy all the abovementioned requirements. For example, the threshold voltages $V_{(10,0,20)}$ achieved are still too unfavorable for many applications and/or the viscosity and/or birefringence values are too high.

Since the various components of liquid-crystal mixtures can have unfavorable effects and this sometimes occurs in an unpredictable manner, the preparation of liquid-crystal mixtures which are required to satisfy various requirements simultaneously is to date a difficult task for the person skilled in the art.

For this reason, the liquid-crystal mixtures known hitherto frequently have one or more of the following disadvantages: an excessively high threshold voltage $V_{(10,0,20)}$, high temperature dependence of the threshold voltage, an excessively high viscosity, an unfavorably high optical anisotropy Δn and a large viewing-angle dependence of the contrast.

A further major problem in liquid-crystal displays of the prior art is the frequency dependence of the dielectric properties and thus of the addressing voltages. A particular problem here is the temperature dependence of the effect, which is very pronounced at low temperatures (for example at –20° C.).

A reduction in the frequency dependence of the addressing voltages enables better multiplex addressing even at higher multiplex ratios. A reduction in the temperature dependence of the frequency dependence enables, in particular, the displays to be operated down to low temperatures.

In liquid-crystalline media for liquid-crystal displays having low addressing voltages in the range from 2 to 3 V (mux. 1:3, bias 1:3; mux. 1:8, bias 1:4 or mux. 1:6, bias 1:5), liquid-crystalline or mesogenic compounds having large dielectric anisotropies ($\Delta\epsilon = \epsilon_\| - \epsilon_\perp$, where $\epsilon_\|$ is the dielectric constant parallel to the director and $\epsilon_\perp$ is the dielectric constant perpendicular to the director).

Such compounds and the media containing them typically have high viscosity values and thus long response times, i.e. switch relatively slowly.

A further problem for the low-temperature behavior is the drastically increasing viscosity of the liquid-crystal media at low temperatures, which is observed in particular in the highly polar media at low addressing voltages. The increase in viscosity, in particular in the rotational viscosity ($\gamma_1$), which is essential for switching in TN and STN displays, results in an increase in the response times which is unacceptable for many applications.

At a given temperature, ($\Delta\epsilon = \epsilon_\| - \epsilon_\perp$) depends on the frequency of the applied (rectangular) voltage, also referred to as the frequency of the addressing voltage or V addressing frequency for short. In a range from 100 Hz to 1000 kHz, which covers the typical addressing frequencies occurring in typical liquid-crystal displays, Δ∈ initially remains constant with increasing frequency. At higher frequencies, Δ∈ then decreases.

For the typical behavior, see also FIG. 3. The slight initial decrease becomes more pronounced with increasing frequency. The value of the negative slope of dΔ∈/df increases until it reaches a maximum value at an inflection point and then decreases again. As the frequencies increase further, Δ∈ then passes through a minimum, typically in the region of negative absolute values.

Since the deviation from constant behavior is difficult to determine experimentally and can only be measured with some error latitude (cf., for example, FIG. 3), it is better to use the frequencies which are characteristic of the frequency dependence, i.e. the frequency of the inflection point ($f(\Delta\epsilon'_{max})$) (at negative slope) and of the minimum ($f(\Delta\epsilon'_{min})$).

Here, owing to the better measurability and in particular owing to the position in the central region of the range in question, the frequency of the inflection point is used.

The frequency dependence of Δ∈ causes problems in the addressing of liquid-crystal displays, since, particularly in the case of multiplex-addressed displays and in particular in the case of such displays having relatively large multiplex ratios (for example 1:16), not only are higher frequencies used, but their overtones also occur. However, if the liquid-crystal media exhibit small Δ∈ values at the higher frequencies which occur, the contrast drops, since the characteristic voltages, for example the threshold voltage $V_{10}$, depend on Δ∈. Thus, media which are frequency-independent wherever possible up to high frequencies are desired.

With decreasing temperature, Δ∈ increases at low frequencies. Since, however, the characteristic frequencies simultaneously drop greatly with decreasing temperature, this effect is overcompensated at high frequencies. Thus, the Δ∈ (f,T) curves for two different temperatures $T_1$ and $T_2$ typically intersect at a certain frequency $f_x$ ($T_1$, $T_2$). The frequency of this intersection point is thus characteristic both of the frequency dependence of the medium as such and, in particular, of its temperature dependence.

The effect of the increase in Δ∈ with decreasing temperature can be compensated relatively simply by changing the addressing voltage used.

The significantly greater frequency dependence at lower temperatures, in particular the shift in the frequency range of the decrease in Δ∈ values, is extremely interfering and is prohibitive for many applications.

There thus continues to be a great demand for liquid-crystal mixtures having a high clearing point, low melting point, low threshold voltage $V_{(10,0,20)}$, small temperature dependencies of the threshold voltage and/or low frequency dependence of the dielectric anisotropy and of the threshold voltage, and low viscosity (and thus short response time) which simultaneously combine the optical anisotropies Δn which are suitable for use in TN and/or STN liquid-crystal cells and very small viewing-angle dependencies of the contrast with good low-temperature behaviour.

An object of the invention is to provide TN liquid-crystal displays and nematic liquid-crystal mixtures for use therein which do not have the above-mentioned disadvantages or only do so to a lesser extent, and in particular have low rotational viscosities $\gamma_1$ or short temperature dependencies of the threshold voltage $d[V_{(10,0,T)}/V_{(10,0,20)}]/dT$ and/or low frequency dependence of the threshold voltage (or dielectric anisotrophy), and in particular at low temperatures.

Upon further study of the specification and appended claims, further objects and advantages of this invention will become apparent to those skilled in the art.

It has now been found that these objects can be achieved if liquid-crystal mixtures according to the invention are used in displays.

An object of the present invention is to provide media which have a smaller frequency dependence of $\Delta\epsilon$, in particular at low temperatures.

It has now been found that liquid-crystalline media in which the inflection point of $\Delta\epsilon$ as a function of the frequency $f(\Delta\epsilon'_{max}, T)$ at T=0° C. is 80 kHz or more are very particularly suitable for displays of this type.

It has furthermore been found that media in which the frequency dependence curves at 0° C. and −20° C. intersect at a frequency of 4 kHz or more are highly suitable for displays of this type.

It has furthermore been found that liquid-crystalline media of this type can preferably be achieved as media comprising one or more compounds of the formula I

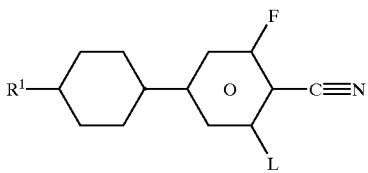

in which
R$^1$ is alkyl or alkoxy having 1 to 12, preferably 1 to 7, particularly preferably 3 to 7, carbon atoms or alkenyl, alkoxyalkyl or alkenyloxy having 2 to 12, preferably 2 to 7, particularly preferably 2 to 5, carbon atoms, and
L is H or F, preferably F,
and one or more compounds of the formula II

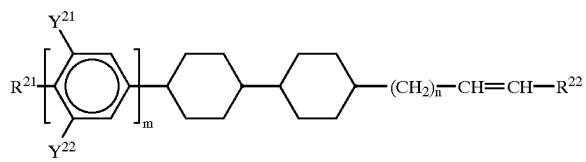

in which
R$^{21}$ is alkyl or alkoxy having 1 to 7, preferably 1 to 5, carbon atoms or alkenyl, alkoxyalkyl or alkenyloxy having 2 to 7 carbon atoms, F, Cl, OCF$_3$ or OCF$_2$H,
R$^{22}$ is H or alkyl having 1 to 10, preferably 1 to 5, carbon atoms, particularly preferably H,
Y$^{21}$ and Y$^{22}$ are each, independently of one another, H or F, n is from 0 to 5, preferably from 0 to 3, and
m is 0 or 1,
which do not have the abovementioned disadvantages or only do so to a much less pronounced degree compared with conventional media.

The terms "alkyl" and "alkoxy" cover straight-chain and branched alkyl and alkoxy groups having 1 to 12 carbon atoms, in particular the straight-chain groups. Particularly preferred alkyl and alkoxy groups are ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, methoxy, octoxy, nonoxy, decoxy, undecoxy or dodecoxy.

In this application, alkyl preferably denotes n-alkyl, alkenyl preferably denotes n-1-E-alkenyl, alkoxyalkyl preferably denotes alkyloxymethyl and alkoxy preferably denotes n-alkoxy.

The term "alkenyl" covers straight-chain and branched alkenyl groups having 2 to 12 carbon atoms, in particular the straight-chain groups. Particularly preferred alkenyl groups are C$_2$–C$_7$-1E-alkenyl, C$_4$–C$_7$-3E-alkenyl, C$_5$–C$_7$-4-alkenyl, C$_6$–C$_7$-5-alkenyl, and C$_7$-6-alkenyl, in particular C$_2$–C$_7$-1E-alkenyl, C$_4$–C$_7$-3E-alkenyl and C$_5$–C$_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Of the alkenyl groups, those having 2 to 5 carbon atoms are particularly preferred.

The term "alkenyloxy" covers straight-chain and branched alkenyloxy groups having 2 to 12 carbon atoms, in particular the straight-chain groups. It denotes in particular vinyloxy, prop-1- or -2-enyloxy, but-1-, -2- or -3-enyloxy, pent-1-, -2-, -3- or -4-enyloxy, hex-1-, -2-, -3-, -4- or -5-enyloxy or hept-1-, -2-, -3-, -4-, -5- or -6-enyloxy, furthermore oct-1-, -2-, -3-, -4-, -5-, -6- or -7-enyloxy, non-1-, -2-, -3-, -4-, -5-, -6-, -7- or -8-enyloxy, dec-1-, -2-, -3-, -4-, -5-, -6-, -7-, -8- or -9-enyloxy, undec-1-, -2-, -3-, -4-, -5-, -6-, -7-, -8-, -9- or -10-enyloxy or dodec-1-, -2-, -3-, -4-, -5-, -6-, -7-, -8-, -9-, -10- or -11-enyloxy.

The compounds of the formulae I and II and their sub-formulae are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for said reactions. Use can also be made here of variants which are known per se, but are not mentioned here in greater detail.

In a first preferred embodiment, the media according to the invention are particularly suitable for improving the frequency dependence of the dielectric anisotropy and the threshold voltage. Generally preferably, and in particular in this preferred embodiment, the liquid-crystalline medium comprises the constituents described below.

The medium preferably comprises one or more compounds of the formula I in which
R$^1$ is alkyl or alkenyl and
L is F,
in particular those in which
R$^1$ is alkyl.

In the compounds of the formula I in the media according to the invention, R$^1$ is preferably alkyl having 3 to 7 carbon atoms, particularly preferably having 5 to 7 carbon atoms.

In this preferred embodiment, the liquid-crystalline medium preferably comprises one or more compounds of the formula IIa IIa

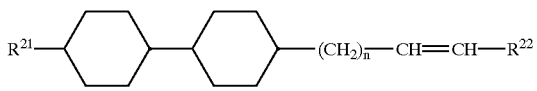

in which

R$^{21}$ and R$^{22}$ are as defined under formula II, preferably

R$^{21}$ is alkyl or alkenyl,

R$^{22}$ is H or alkyl having 1 to 3 carbon atoms, and n is 0.

The liquid-crystalline medium particularly preferably comprises two or more compounds of the formula I and one or more compounds of the formula II and preferably of the formula IIa.

The liquid-crystalline medium especially preferably comprises one or more compounds of the formula I in which R$^1$ is alkenyl having 3 to 7 carbon atoms, and L is F.

In another embodiment, the liquid-crystalline medium comprises one or more compounds of the formula I in which R$^1$ is alkyl having 3 to 7 carbon atoms, and L is H or F, preferably F.

Preference is furthermore given to liquid-crystalline media which comprise one or more compounds of the formula IIa in which R$^{21}$ is alkyl, and R$^{22}$ is H.

Preference is additionally given to liquid-crystalline media which comprise one or more compounds of the formula IIa in which R$^{21}$ is alkenyl and R$^{22}$ is H.

Besides the compounds of the formulae I and II, preferably of the formula IIa, the liquid-crystalline media according to the invention comprise further liquid-crystalline or mesogenic compounds.

The liquid-crystalline media preferably comprise one or more compounds of the formula III

III

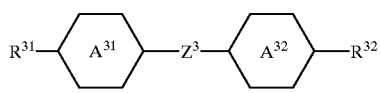

in which

R$^{31}$ and R$^{32}$ are each, independently of one another, H, an alkyl or alkenyl radical having 1 to 15 carbon atoms which is unsubstituted, monosubstituted by CN or CF$_3$ or at least monosubstituted by halogen, where one or more CH$_2$ groups in these radicals may also, in each case independently of one another, be replaced by —O—, —S—, —◇—, —CO—, —CO—O—, —O—CO— or —O—CO—O— in such a way that O atoms are not linked directly to one another, A$^{31}$ and A$^{32}$ are each, independently of one another, (a) a trans-1,4-cyclohexylene radical, in which, in addition, one or more non-adjacent CH$_2$ groups may be replaced by —O— and/or —S—, (b) a 1,4-phenylene radical, in which, in addition, one or two CH groups may be replaced by N, (c) a radical from the group consisting of 1,4-cyclohexenylene, 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals (a) and (b) may be substituted by one or two fluorine atoms, and Z$^3$ is —CO—O—, —O—CO—, —CH$_2$O—, —OCH$_2$—, —CH$_2$CH$_2$—, —CH=CH—, —C≡C— or a single bond, or alternatively —(CH$_2$)$_4$— or —CH=CH—CH$_2$CH$_2$—, and preferably R$^{31}$ and R$^{32}$, independently of one another, are alkyl or alkoxy having 1 to 7 carbon atoms or alkenyl, alkenyloxy or alkoxyalkyl having 2 to 7 carbon atoms, A$^{31}$ and A$^{32}$, independently of one another, are 1,4-trans-cyclohexylene, 1,4-phenylene, 3-fluoro-1,4-phenylene or 2,3-difluorophenylene, Z$^3$ is —CO—O—, —CH$_2$—CH$_2$—, —CH=CH—, —C≡C— or a single bond.

The liquid-crystalline media particularly preferably comprise one or more compounds selected from the group consisting of the formulae IIIa–IIIc IIIa

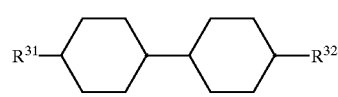

IIIb

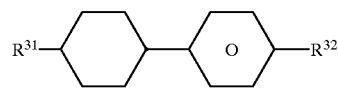

IIIc

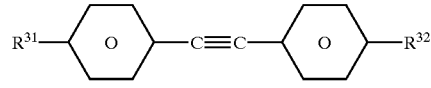

in which

R$^{31}$ and R$^{32}$, independently of one another, are alkyl or alkoxy having 1 to 7 carbon atoms or alkenyl, alkenyloxy or alkoxyalkyl having 2 to 7 carbon atoms.

The media according to the invention particularly preferably comprise one or more compounds of the formulae IIIa to IIIc in which R$^{31}$ is alkyl or alkenyl, and R$^{32}$ is alkyl, alkoxy or alkenyl.

The liquid-crystalline media according to the invention preferably comprise one or more compounds of the formula IV

IV

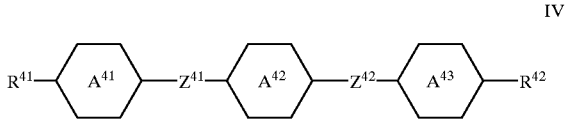

in which

R$^{41}$, R$^{42}$, A$^{41}$, A$^{42}$, A$^{43}$, Z$^{41}$ and Z$^{42}$ each, independently of one another, are as defined above under formula III for the respectively corresponding groups R$^{31}$, R$^{32}$, A$^{31}$, A$^{32}$ and Z$^3$.

The liquid-crystalline media according to the invention preferably comprise, as further compounds of this type, one or more compounds selected from the group consisting of the compounds of the formulae IVa and IVb

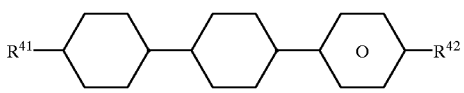
IVa

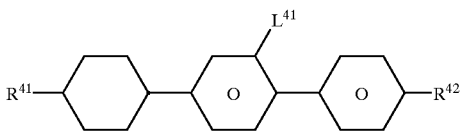
IVb in which
R$^{41}$ and R$^{42}$, independently of one another, are alkyl or alkoxy having 1 to 7 carbon atoms or alkenyl, alkenyloxy or alkoxyalkyl having 2 to 7 carbon atoms, and L$^{41}$ is H or F.

In addition, the media according to the invention preferably comprise one or more compounds of the formula V

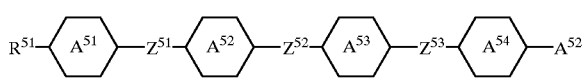
V in which
R$^{51}$, R$^{52}$, A$^{51}$, A$^{52}$, A$^{53}$, A$^{54}$, Z$^{51}$, Z$^{52}$ and Z$^{53}$ are each, independently of one another, as defined above under formula III for R$^{31, R32}$, A$^{31}$, A$^{32}$ and Z$^{3}$.

These compounds are preferably selected from the group consisting of the compounds of the formulae Va and Vb

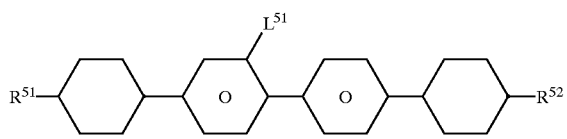
Va

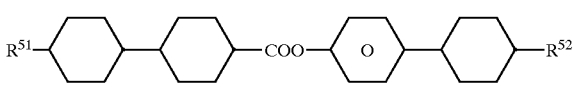
Vb in which
R$^{51}$ and R$^{52}$, independently of one another, are alkyl or alkoxy having 1 to 7 carbon atoms or alkenyl, alkenyloxy or alkoxyalkyl having 2 to 7 carbon atoms, and L$^{51}$ is H or F.

The media according to the invention very particularly preferably comprise one or more compounds of the formula VI

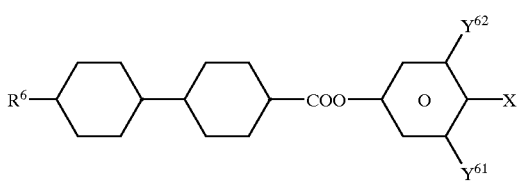
VI in which
R$^{6}$ is alkyl having 1 to 7 carbon atoms, preferably having 2 to 5 carbon atoms, particularly preferably having 3 carbon atoms, X is F, Cl or OCF$_{3}$, preferably F, and
Y$^{61}$ and Y$^{62}$, independently of one another, are H or F, preferably one is F, particularly preferably both are F.

The media optionally comprise one or more compounds of the formula VII

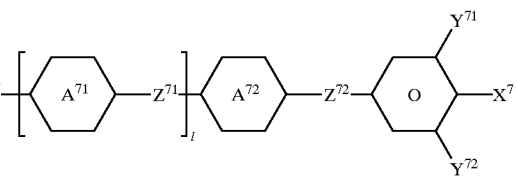

in which
R$^{7}$ is an alkyl or alkoxy group with 1 to 12 carbon atoms or an alkenyl or alkenyloxy group having 2 to 12 carbon atoms, preferably n-alkyl having 2 to 7 carbon atoms or alkenyl having 2 to 7 carbon atoms, X$^{7}$ is CN, F, Cl, —CF$_{3}$, —CF$_{2}$Cl, —CFHCl, —CF$_{2}$H, —OCF$_{3}$, —OCF$_{2}$Cl, —OCFHCl or —OCHF$_{2}$, preferably CN, F, —OCF$_{3}$ or —OCHF$_{2}$, l is 0 or 1, and
Y$^{71}$ and Y$^{72}$ are each, independently of one another, H or F, and
A$^{71}$, A$^{72}$, Z$^{71}$ and Z$^{72}$ are each, independently of one another, as defined above under formula III for A$^{31}$, A$^{32}$, Z$^{31}$, Z$^{32}$, where the compounds of the formula VII are different from those of the formula VI.

These compounds are preferably selected from the group consisting of the compounds of the formulae VIIa to VIIc

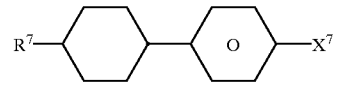
VIIa

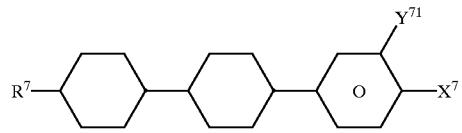
VIIb

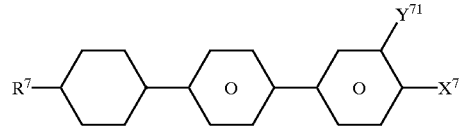
VIIc in which
R$^{7}$ is n-alkyl having 2 to 7 carbon atoms or alkenyl having 2 to 7 carbon atoms,
X$^{7}$ is F or CN, and
Y$^{71}$ is H or F.

Preference is given to compounds of the formula VIIa, in particular in which X=CN.

The concentration of the compounds of the formula I in the mixture as a whole is from 10 to 50%, preferably from 20 to 40%, particularly preferably from 25 to 35%.

The concentration of the compounds of the formula II, preferably of the formula IIa, in the mixture as a whole is from 5 to 40%, preferably from 7 to 30%, particularly preferably from 9 to 25%.

The concentration of the compounds of the group of compounds of the formula III, preferably of the formulae IIIa to IIIc, is from 0 to 25%, preferably from 1 to 20%, particularly preferably from 4 to 16%.

The compounds of the formula IV, preferably of the formulae IVa to IVb, used in a total amount of from 0 to 30%, preferably from 5 to 25%, particularly preferably from 7 to 20%.

The compounds of the formula V, preferably of the formulae Va and Vb, are used in total concentrations of from 0 to 30%, preferably from 3 to 20%, particularly preferably from 5 to 15%.

If compounds of the formula VI are employed, their concentration is from 5 to 25%, preferably from 10 to 20%.

The compounds of the formula VII, preferably of the formulae VIIa to VIIc, are employed in an amount of from 0 to 20%, preferably from 5 to 15%.

Generally and in particular in a further preferred embodiment which is particularly suitable for achieving low temperature dependence, the media have the compositions and properties described below.

The nematic liquid-crystalline media which have a positive dielectric anisotropy ($\Delta\epsilon \geq 1.5$) preferably comprise one or more compounds of the formula Ia

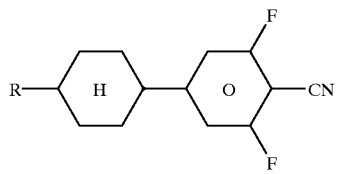

in which
R$^1$ is as defined above under formula I,
and one or more compounds of the formula IIb

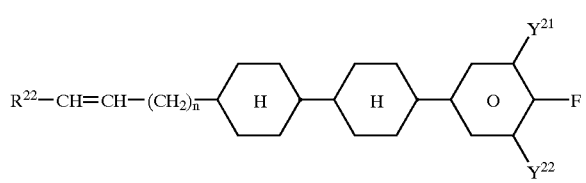
IIb in which
R$^{22}$ and n are as defined above under formula II, and
Y$^{21}$ and Y$^{22}$ are each, independently of one another, H or F, preferably at least one and particularly preferably precisely one of Y$^{21}$ and Y$^{22}$ is F.

Preferred compounds of the formula Ia are those in which R is a straight-chain alkyl radical.

Preferred compounds of the formula IIb are those in which R$^{22}$ is vinyl or a straight-chain 1E- or 3E-alkenyl radical having 3 to 12, preferably having 3 to 5, carbon atoms. Of these compounds, those in which R$^{22}$ is vinyl or 1E-propenyl are in turn very particularly preferred.

The use of the compounds of the formulae Ia and IIb in the mixtures for TN liquid-crystal displays according to the invention produces, in particular, low rotational viscosities $\gamma_1$ or short response times, simultaneously low threshold voltages $V_{(10,0,20)}$ and low temperature dependencies of the threshold voltage $d[V_{(10,0,T)}/V_{(10,0,20)}]/dT$.

Particularly when used in TN liquid-crystal displays having higher layer thicknesses, the mixtures according to the invention are distinguished by low overall response times ($t_{overall}=t_{on}+t_{off}$)

The liquid-crystal mixtures according to the invention are furthermore distinguished by high stability and favorable values for the electrical resistance and frequency dependence of the threshold voltage. The TN liquid-crystal displays according to the invention in addition have a large working-temperature range. In particular when the TN liquid-crystal displays according to the invention are operated at the first transmission minimum, they are additionally distinguished by good angle dependence of the contrast.

Particularly when used in TN liquid-crystal displays having high layer thicknesses, the mixtures according the invention are distinguished by low overall response times ($t_{overall}=t_{on}+t_{off}$) preferably from 40 to 70% by weight, based on the mixture as a whole.

The content of compounds of the formula Ia is preferably from 5 to 45% by weight, particularly preferably from 15 to 40% by weight, especially preferably from 20 to 40% by weight, based on the mixture as a whole.

The content of compounds of the formula IIb is preferably from 5 to 30% by weight, particularly preferably from 5 to 25% by weight, especially preferably from 10 to 25% by weight, based on the mixture as a whole.

The liquid-crystal mixtures according to the invention, in addition to the compounds of the formulae Ia and IIb, preferably comprise one or more dielectrically positive compounds ($\Delta\epsilon > 1.5$) selected from the group comprising the formula VI, as given above, and formula VII.

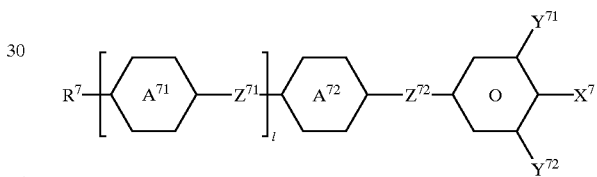

in which the parameters are as defined above under formula VII and preferably

R$^7$ is an alkyl or alkoxy group with 1 to 12 carbon atoms or an alkenyl or alkenyloxy group having 2 to 12 carbon atoms, n-alkyl having 2 to 7 carbon atoms or alkenyl having 2 to 7 carbon atoms, X$^7$ is CN, F, —OCF$_3$ or —OCHF$_2$, l is 0 or 1, and Y$^{71}$ and Y$^{72}$ are each, independently of one another, H or F, and A$^{71}$, A$^{72}$, Z$^{71}$ and Z$^{72}$ are each, independently of one another, as defined above under formula III for A$^{31}$, A$^{32}$, Z$^{31}$ and Z$^{32}$, and preferably Z$^{71}$ is —COO—, —CH$_2$CH$_2$— or a single bond, and
Z$^{72}$ is —CH$_2$CH$_2$—, —COO—, —C≡C— or a single bond, and where the compounds of formula VII are different from the compounds of the formulae I, II and VI.

Particular preference is given to compounds selected from the group consisting of the compounds of the formulae VI, VIIa to VIIc and VIId to VIIj:

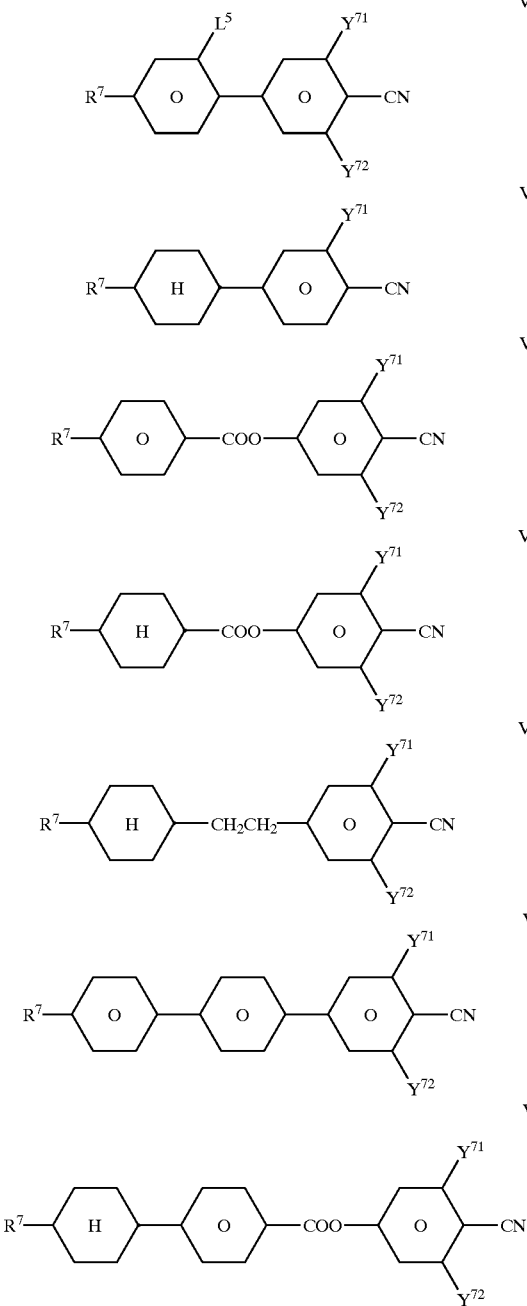

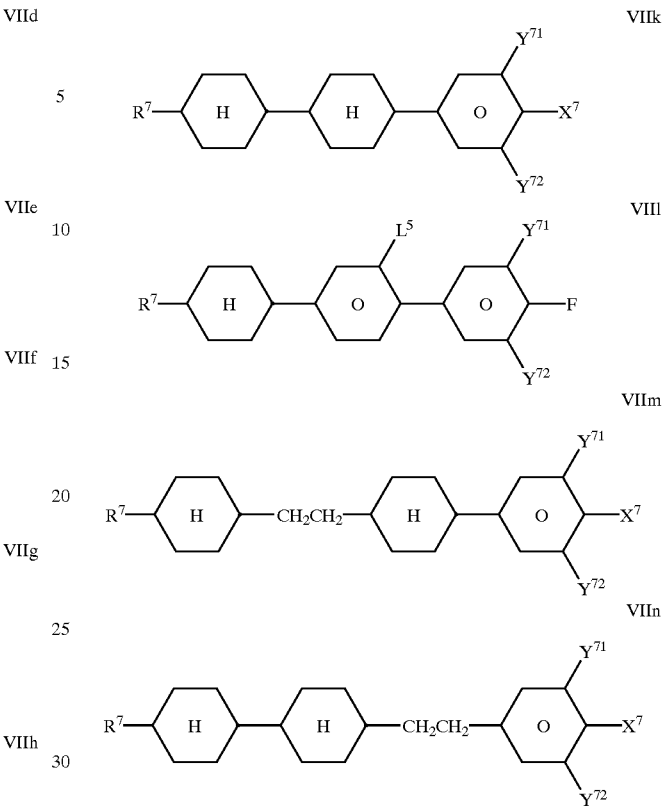

in which $R^7$ is as defined above under the formula VII and $Y^{71}$, $Y^{72}$ and $L_5$ are each, independently of one another, H or F.

Of the compounds of the formulae VI and VIIa to VIIj, preference is given to the compounds of the formulae VI, VIIa and VIIf, in particular the compounds of the formula VIIa and the compounds of the formula VIIf in which one of the radicals $Y^{71}$ and $Y^{72}$ is F and the other of these radicals is H.

Preference is furthermore given to tricyclic compounds of the formula VII conforming to the subformulae VIIk to VIIn:

in which $R^7$ is as defined above under formula VII, $X^7$ is F, Cl, $CF_3$, $OCF_3$ or $OCHF_2$, $Y^{71}$, $Y^{72}$ and $L^5$ are each, independently of one another, H or F, and the compounds of the formula VIIk are different from the compounds of the formula IIb and VIIb.

Particular preference is given to mixtures comprising one or more compounds of the formula VI.

Of the compounds of the formulae VIIk to VIIn, preference is given to those in which $Y^{71}$ is F, furthermore those in which $Y^{71}$ and $Y^{72}$ are F.

Of the compounds of the formula VI, preference is given to those in which $Y^{61}$ and $Y^{62}$ are F.

The content of all compounds of the formulae VI, VIIa and VIId to VIIj is preferably from 5 to 35% by weight, particularly preferably from 5 to 25% by weight, based on the mixture as a whole.

The content of all compounds of formulae VIIk to VIII is preferably from 5 to 35% by weight, particularly preferably from 5 to 25% by weight, based on the mixture as a whole.

The content of all terminally fluorinated compounds or compounds carrying terminally fluorinated groups is preferably from 5 to 65% by weight, particularly preferably from 15 to 40% by weight, based on the mixture as a whole.

The content of all compounds of the formulae VI and VII, preferably of the formulae VI and VIIa to VIIN, is preferably from 10 to 40% by weight, particularly preferably from 10 to 35% by weight, based on the mixture as a whole.

The content of all compounds of the formulae I, II, VI and VII, preferably of the formulae Ia, IIa, VI and VIIa to VIIN, is preferably from 40 to 90% by weight, particularly preferably from 50 to 80% by weight, especially preferably from 60 to 80% by weight, based on the mixture as a whole.

Besides two or more compounds selected from the formulae Ia and IIb, preferred mixtures comprise one, two, three or more compounds selected from the formulae VIIa, VIIe, VIIf and VI. These mixtures preferably comprise two to four compounds selected from the group of compounds of the formulae Ia and IIb, one or more compounds selected from the group consisting of the formulae VIIa and VIIf in which one of the radicals $Y^{71}$ or $Y^{72}$ is F and the other of these radicals is H, and one to four compounds of the formula VI where one of the radicals $Y^{61}$ and $Y^{62}$ is F and the other of these radicals is H.

In the preferred compounds, mentioned above and below, of the subformulae to the formulae III, IV, V, VI and VII, the radicals $R^{31}$, $R^{32}$, $R^{41}$, $R^{42}$, $R^{51}$, $R^{52}$, $R^6$ and $R^7$ unless stated otherwise, are preferably straight-chain alkyl, alkenyl or alkoxy, in particular alkyl having 1 to 12 carbon atoms or 1E-alkenyl having 2 to 7 carbon atoms, especially having 1 to 7 carbon atoms and 2 to 7 carbon atoms respectively.

The liquid-crystal mixtures according to the invention preferably comprise one or more compounds selected from the group consisting of the compounds of the formulae III to V.

The compounds of the formulae III to V are predominantly dielectrically neutral ($-1.5 \leq \Delta\epsilon \leq +1.5$). They are distinguished, in particular, by their low values for the rotational viscosity $\gamma_1$.

Preferred liquid-crystal mixtures comprise one or more compounds selected from the group consisting of the compounds of the formulae III to V, preferably from 10 to 50% by weight.

The liquid-crystal mixtures according to the invention preferably comprise one or more compounds selected from the group consisting of the compounds of the formulae IIIa, IIIb and IIId to IIIj:

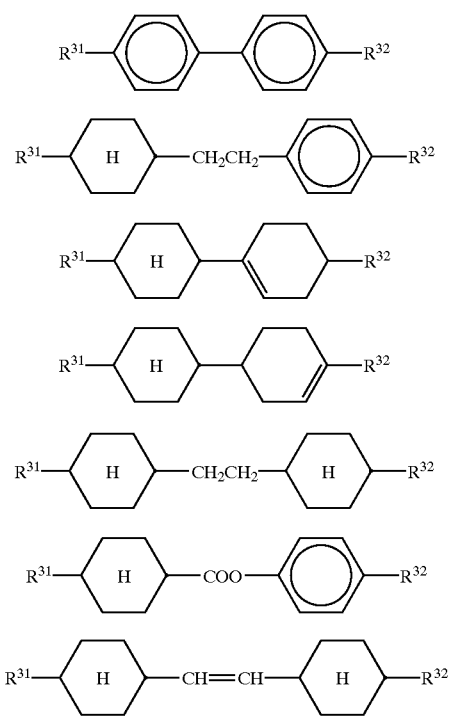

in which $R^{31}$ and $R^{32}$ are each, independently of one another, as defined above under the formula III.

The liquid-crystal mixtures according to the invention particularly preferably additionally comprise one or more compounds selected from the group consisting of the compounds of the formulae IVa, IVb and IVc to IVo:

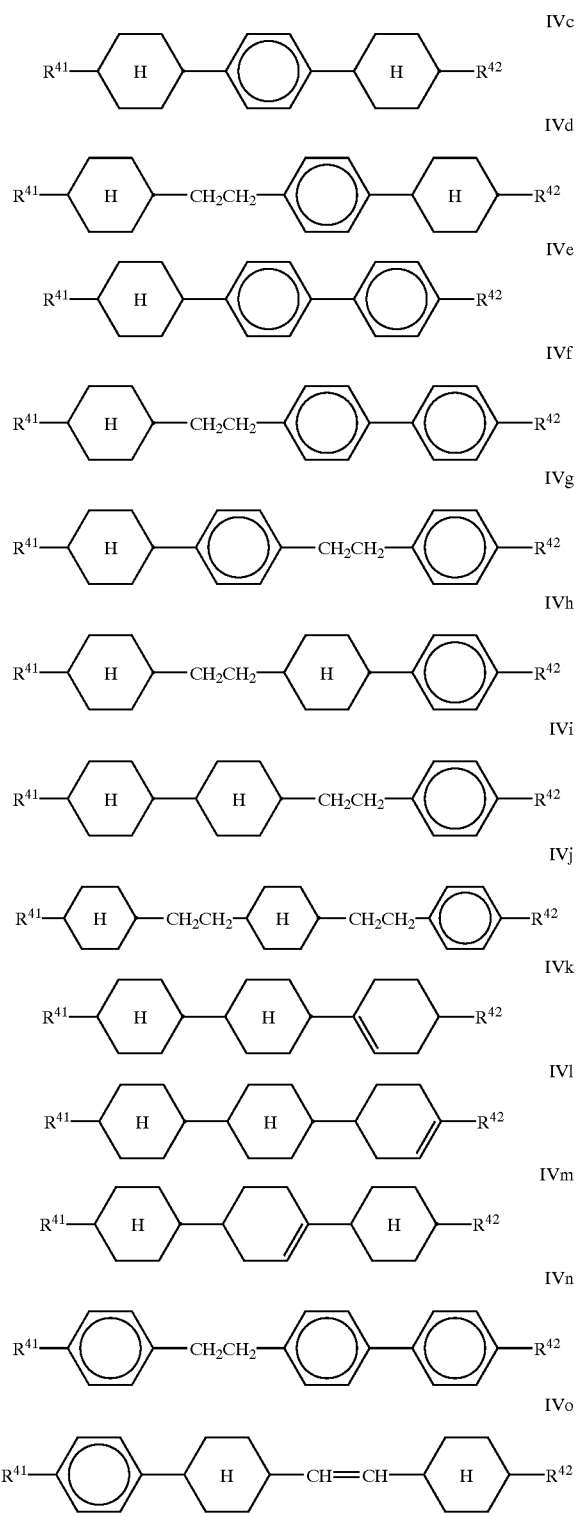

in which $R^{41}$ and $R^{42}$ are each as defined above under the formula IV. The 1,4-phenylene groups in the compounds of the formulae IVc to IVg, IVn and IVo may each, independently of one another, also be monosubstituted or polysubstituted by fluorine.

The liquid-crystal mixtures according to the invention especially preferably additionally also comprise one or more compounds selected from the group consisting of the compounds of the formulae Va, Vb and Vc to Vg:

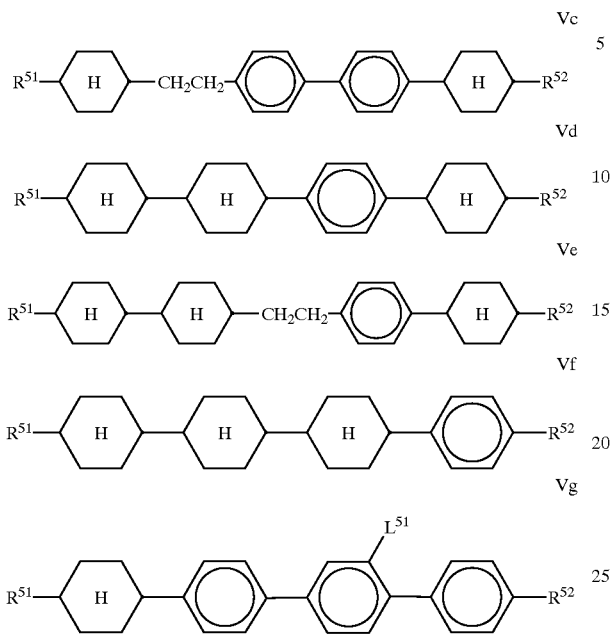

in which $R^{51}$ and $R^{52}$ are each as defined above under the formula V, and $L^{51}$ is F or H. The 1,4-phenylene groups in the compounds of the formulae Va to Vg may each, independently of one another, also be monosubstituted or polysubstituted by fluorine.

$R^{41}$, $R^{42}$, $R^{51}$ and $R^{52}$ in the compounds of the formulae IVa to IVo and Va to Vg are preferably each, independently of one another, straight-chain alkyl or alkoxy having 1 to 12 carbon atoms. Particular preference is given to compounds of the formulae IVa to IVo to Va to Vg in which $R^{41}$ and $R^{51}$ are alkyl and $R^{42}$ and $R^{52}$ are alkyl or alkoxy, each having 1 to 7 carbon atoms.

However, of the compounds of the formulae IVa to IVo, particular preference is also given to those compounds in which $R^{41}$ and/or $R^{42}$ are each, independently of one another, straight-chain alkenyl having 2 to 12 carbon atoms, in particular having 2 to 7 carbon atoms.

Preference is furthermore given to compounds of the formulae Va and Vg in which L is F.

In a particularly preferred embodiment, the mixtures according to the invention comprise one or more compounds selected from the group consisting of the compounds of the formulae IIIb, IVb and Vb.

In a further particularly preferred embodiment, the mixtures according to the invention comprise from about 5 to 50% by weight, preferably from 5 to 35% by weight, especially 5 to 25% by weight, of liquid-crystalline tolan compounds, for example if the liquid-crystal displays according to the invention are to be operated at the second or a higher transmission minimum. This allows smaller layer thicknesses to be used, significantly shortening the response times. The tolan compounds present in these liquid-crystal mixture: are preferably selected from the group consisting of the compounds of the formulae IIIk, VIIo, IVp and IVq:

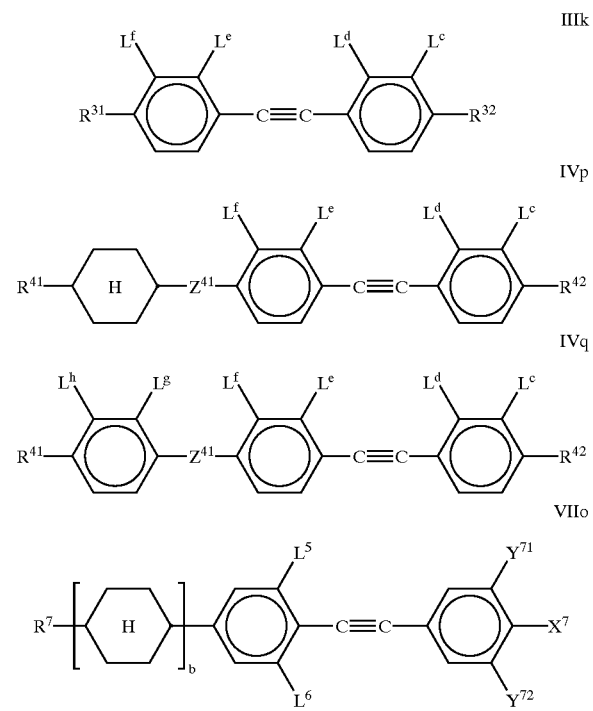

in which $R^{31}$, $R^{32}$, $R^{41}$, $R^{42}$ and $R^7$ are each, independently of one another, as defined above under the formulae III, IV and VII, b is 0 or 1, $X^7$ is F, Cl or $OCF_3$, $Z^{41}$ is —$CH_2CH_2$—, —COO— or a single bond, in particular a single bond, and $L^c$ to $L^h$, $L^5$ and $L^6$ are each, independently of one another, H or F, but where both substituents of the respective pair are not simultaneously F in any of the three substituent pairs $L^c$ and $L^d$ or $L^e$ and $L^f$ or $L^g$ and $L^h$.

In a further particularly preferred embodiment, the mixtures according to the invention preferably comprise from about 5 to 20% by weight of one or more dielectrically negative compounds ($\Delta\epsilon < -1.5$).

These compounds preferably contain the structural element 2,3-difluoro-1,4-phenylene, for example compounds as described in DE-A-38 07 801, 38 07 861, 38 07 863, 38 07 864 or 38 07 908. Particular preference is given to tolans containing this structural element as described in international patent application PCT/DE 88/00133, in particular those of the formulae IIIm and IVr

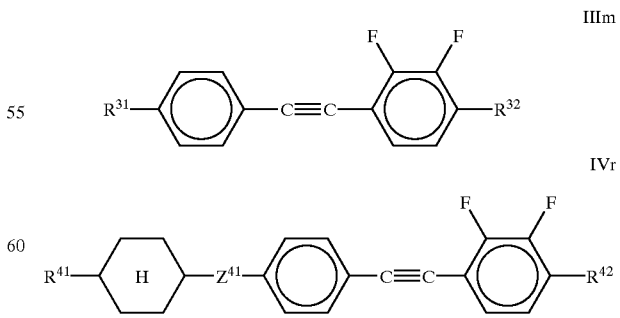

in which $R^{31}$, $R^{32}$, $R^{41}$ and $R^{42}$ are each, independently of one another, as defined under the formulae III and IV, and $Z^{41}$ is —$CH_2CH_2$—, —COO— or a single bond.

Further known dielectrically negative compounds are, for example, derivatives of the 2,3-dicyanohydro-quinones or cyclohexane derivatives containing the structural unit

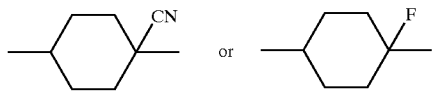

as described in DE-A-32 31 707 or DE-A 34 07 013.

The individual compounds of the formulae III to VII and their subformulae and also other compounds which can be used in the displays according to the invention are either known or can be prepared analogously to the known compounds.

In further preferred embodiments, the mixtures comprise
one, two or more compounds selected from the compounds of the formula VIId in which $Y^{71}$, $Y^{72}$ and $L^5$ are H, the compounds of the formula VIIe in which $Y^{71}$ is H, and the compounds of the formula VIIf in which one or two of the radicals $Y^{71}$ and $Y^{72}$ is F and the other of these radicals is H. The radical $R^7$ in these compounds is as defined above under formula VII and is preferably straight-chain alkyl, in particular having 2, 3, 4 or 5 carbon atoms. The content of these compounds is preferably from 0 to 60% by weight, in particular from 10 to 45% by weight, based on the mixture as a whole;

one or more, in particular one, two, three or four, compounds selected from the compounds of the formula VIIk in which $X^7$ is $OCF_3$ or $OCHF_2$ and $Y^{71}$ and $Y_{72}$ are each, independently of one another, H or F, the compounds of the formula VIId in which $Y^{71}$, $Y^{72}$ and $L^5$ are each, independently of one another, H or F, in particular in which $L^5$ is H and $Y^{71}$ and $Y^{72}$ are leach, independently of one another, H or F, and the compounds of the formula VIIm in which $X^7$ and $Y^{71}$ are F and $Y^{72}$ is H or F, or in which $X^7$ is $OCF_3$ and $Y^{71}$ and $Y^{72}$ are each, indepenently of one another, H or F. The radical $R^7$ in these compounds is as defined above under formula VII and is preferably straight-chain alkyl, in particular having 2, 3, 4, or 5 carbon atoms, or straight-chain alkenyl, in particular vinyl or 1E-alkenyl having 3, 4 or 5 carbon atoms. The compounds of the formula VIIk are different from the compounds of the formula IIb. The content of these compounds is preferably from 0 to 30% by weight, in particular from 5 to 25% by weight, based on the mixture as a whole;

one or more compounds selected from the compounds of the following formulae:

IIIa

IVe

IVf

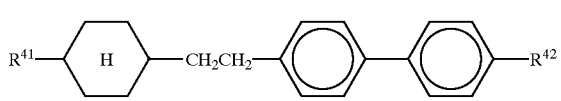

in which $R^{31}$, $R^{32}$, $R^{41}$ and $R^{42}$ are each, independently of one another, straight-chain alkyl or alkoxy having 1 to 12 carbon atoms, preferably having 1 to 7 carbon atoms, or straight-chain alkenyl having 2 to 12 carbon atoms, preferably having 2 to 7 carbon atoms. The 1,4-phenylene groups in the abovementioned compounds may also be substituted by fluorine. The content of these compounds is preferably from 0 to 35% by weight, in particular from 5 to 30% by weight, based on the mixture as a whole;

one or more compounds selected from the compounds of the following formulae:

IV25

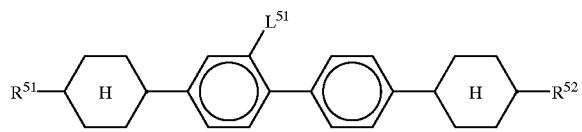

IV30

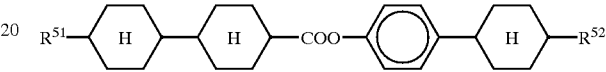

in which $R^{51}$ and $R^{52}$ are each, independently of one another, straight-chain alkyl or alkoxy having 1 to 12 carbon atoms, preferably having 1 to 7 carbon atoms, and $L^{51}$ is H or F, preferably F. The content of these compounds is preferably from 0 to 45% by weight, in particular from 4 to 30% by weight, based on the mixture as a whole;

one or more compounds selected from the compounds of the formulae VIIo, IIIk, IVp and IVq, in particular one or more compounds selected from the compounds of the formula IIIk in which $L^c$ to $L^f$ are H, and the compounds of the formula IVp in which $L^c$ to $L^f$ are H and $Z^{41}$ is a single bond. The content of these compounds is preferably from 0 to 25% by weight, in particular from 1 to 15% by weight, based on the mixture as a whole;

one or more compounds in which $R^1$ or $R^{21}$ is a trans-alkenyl group or a trans-alkenyloxy group;

one or more, in particular one, two or three, compounds of the formula VIIe in which $Y^{71}$ is H, one or more, in particular one or two, compounds of the formula: VI in which $Y^{61}$ and $Y^{62}$ are F, one or more, in particular one or two, compounds of the formula IIIb, one or more, in particular one or two, compounds of the formula IVb, and one or more, in particular one, two or three, compounds of the formula Vb. The alkyl radicals in the compounds of the formulae VIIe and VI, IIIb, IVb and Vb are preferably straight-chain alkyl, in particular having 2, 3, 4 or 5 carbon atoms, or the radical $R^{32}$ in the compounds of the formula IIIb is preferably straight-chain alkoxy, in particular having 2, 3, 4 or 5 carbon atoms.

The liquid-crystal mixtures according to the invention make it possible, while retaining the nematic phase down to –20° C., preferably down to –30° C., particularly preferably down to –40° C., to achieve clearing points $T_{N,I} \geq 60°$ C., preferably $\geq 65°$ C., particularly preferably $\geq 70°$ C. The nematic phase range preferably has a width of at least 85 degrees, particularly preferably at least 95 degrees. This range preferably extends from at least –25° C. to +63° C.

The shelf life in test cells at –20° C., preferably at –30° C., is more than 500 hours, preferably more than 1000 hours.

At the same time, the present invention makes it possible to achieve dielectric anisotropies $\Delta\epsilon$ of $\geq 4$, preferably $\geq 5$, particularly preferably $\geq 8$, especially preferably $\geq 10$, very particularly preferably $\geq 12$. The threshold voltages $V_{(10,0,20)}$ thus achieved are <1.5 V, preferably $\leq 1.3$ V, particularly preferably $\leq 1.1$ V. The mixtures are thus characterized by low operating voltages $V_{op}$.

In particular in the embodiment of low frequency dependence, the threshold voltage in TN cells at d·Δn=0.5 μm is 1.5 V or less, preferably 1.2 V or less, particularly preferably 1.05 V or less.

The average temperature dependence of the threshold voltage TN cells at d·Δn=0.5 μm d[$V_{(10,0,T)}$/$V_{(10,0,20)}$]/dT of the liquid-crystal mixtures according to the invention is preferably $\leq 0.15\%$/degree, particularly preferably $\leq 0.08\%$/degree, especially preferably $\leq 0.05\%$/degree, in the range from 0° C. to 40° C.

The rotational viscosity $\gamma_1$ of the liquid-crystal mixtures according to the invention at 20° C. is less than 200 mPa·s, preferably $\leq 190$ mPa·s, articularly preferably $\leq 160$ mPa·s, very particularly preferably $\leq 145$ mPa·s, or $\leq 140$ mPa·s, especially preferably $\leq 120$ mPa·s. The flow viscosity $V_{20}$ at 20° C. is preferably $\leq 60$ mPa·s, particularly preferably $\leq 50$ mPa·s.

The frequency dependence of $\Delta\in$ of the liquid-crystal media according to the invention is low, in particular at low temperatures. The frequency of the inflection point of $\Delta\in$ as a function of the frequency $f(\Delta\in'_{max}T)$ is at 20° C., 250 kHz or more, preferably 300 kHz or more, particularly preferably 330 kHz or more, very particularly preferably 380 kHz or more, at 0° C., 80 kHz or more, preferably 160 kHz or more, particularly preferably 200 kHz or more, very particularly preferably 220 kHz or more, and at −20° C., 10 kHz or more, preferably 25 kHz or more, particularly preferably 40 kHz or more, very particularly preferably 50 kHz or more.

For the media according to the invention, the frequency at which the frequency-dependence curves intersect for given temperatures $f_x(T_1, T_2)$ is at $T_1=0°$ C. and $T_2=20°$ C., 30 kHz or more, preferably 50 kHz or more, particularly preferably 70 kHz or more, very particularly preferably 80 kHz or more, at $T_1=-20°$ C. and $T_2=0°$ C., 4 kHz or more, preferably 6 kHz or more, particularly preferably 8 kHz or more, very particularly preferably 10 kHz or more.

The ratio between the frequencies at the inflection points at two temperatures $f(\Delta\in'_{max},T_2)/f(\Delta\in'_{max},T_1)$ of the media according to the invention is at $T_1=0°$ C. and $T_2=20°$ C., 3 or less, preferably 2 or less, particularly preferably 1.7 or less, very particularly preferably 1.6 or less, at $T_1=-20°$ C. and $T_2=0°$ C., 10 or less, preferably 8 or less, particularly preferably 6 or less, very particularly preferably 5 or less.

The liquid-crystal mixtures according to the invention are preferably suitable for operating TN liquid-crystal displays at the first Gooch and Tarry transmission minimum (C. H. Gooch, H. A. Tarry, Electron Lett. 10, 2–4, 1974; C. H. Gooch, H. A. Tarry, Appl. Phys., Vol. 8, 1575–1584, 1975). In this case, the optical anisotropies Δn of the liquid-crystal mixtures according to the invention at 20° C. are preferably in a range between 0.08 and 0.12, particularly preferably in a range between 0.09 and 0.11. However, the liquid-crystal mixtures according to the invention can also be used to operate TN liquid-crystal displays at the second or a higher transmission minimum. In this case, the optical anisotropies Δn of the liquid-crystal mixtures according to the invention at 20° C. is preferably in a range between 0.10 and 0.20, particularly preferably between 0.14 and 0.16.

The person skilled in the art can set the optical anisotropy Δn necessary for a given layer thickness d of the TN liquid-crystal display through a suitable choice of the individual components and their proportions by weight using simple routine methods. If the value for the optical path difference d·Δn is specified, the value for the optical anisotropy Δn is determined by the layer thickness d. In particular at high values for d·Δn, for example if the TN liquid-crystal display according to the invention is to be operated at the second or a higher transmission minimum, the use of liquid-crystal mixtures according to the invention having a high value for the optical anisotropy Δn is generally preferred since the value for d can then be chosen to be relatively small, which results in better response-time values.

It goes without saying that a suitable choice of the components also allows properties of the liquid-crystal mixtures according to the invention other than the optical anisotropy Δn to be varied within certain limits. For example, higher clearing points $T_{N,I}$ can be achieved at lower dielectric anisotropies and thus higher threshold voltages $V_{(10,0,20)}$ or lower clearing points can be achieved at higher dielectric anisotropies and thus lower threshold voltages while retaining the other advantageous properties. Mixtures of higher $\Delta\in$ and thus lower thresholds can likewise be obtained even at viscosities which have been increased correspondingly little.

The liquid-crystal media according to the invention preferably comprise from 5 to 25, particularly preferably from 6 to 20, in particular from 8 to 15, compounds.

The present invention also relates to the use of the liquid-crystalline media according to the invention in electro-optical display elements for electro-optical displays.

The present invention furthermore relates to electro-optical displays, in particular TN and STN displays, which contain display elements containing a liquid-crystalline medium according to the invention.

The structure of the TN and STN displays according to the invention from polarizers, electrode baseplates and surface-treated electrodes corresponds to the conventional construction for displays of this type. The term "conventional construction" here is broadly drawn and also covers all derivatives and modifications of the TN display, in particular including "high twist" and "low twist" TN, and derivatives and modification of the STN display, such as OMI, EVA, D-STN and compensated STN (in particular film-compensated) and very particularly reflective displays.

The structure of the liquid-crystal display elements according to the invention from one or more polarizers, electrode baseplates and electrodes having such a surface treatment that the preferential direction (director) of the liquid-crystal molecules adjacent in each case are usually mutually twisted from one electrode to the other by an amount of from 70° to 110°, corresponds to the conventional construction for display elements of this type. The term "conventional construction" here is broadly drawn and also covers all derivatives and modifications of the TN liquid-crystal display.

The surface tilt angles at the two outer plates can be identical or different. Identical tilt angles are preferred. Preferred TN liquid-crystal displays have pretilt angles between the longitudinal axis of the molecules at the surface of the outer plates and the outer plates of from 0° to 7°, preferably from 0.01° to 5°, in particular from 0.1° to 2°.

The twist angle of the mixture in the TN liquid-crystal display has a value of between 22.5° and 170°, preferably between 45° and 130°, particularly preferably between 60° and 115°. The twist angle especially preferably has a value of between 70° and 110°.

An essential difference of the displays according to the invention from the conventional displays hitherto, based on the twisted nematic cell, twists, however, in the choice of the liquid-crystal parameters of the liquid-crystal layer.

The liquid-crystal mixtures which can be used in accordance with the invention are prepared in a manner conventional per se. In general, the desired amount of the components used in lesser amount are dissolved in the components making up the principal constituent, expediently at elevated temperature. It is also possible to prepare the mixtures in other conventional manners, for example by using premixtures, for example homologue mixtures, or using so-called multi-bottle systems.

The dielectrics may also contain further additives known to the person skilled in the art and described in the literature. For example, 0–15%, preferably 0–10%, of pleochroic dyes and/or chiral dopants can be added. The individual compounds added are employed in concentrations of from 0.01 to 6%, preferably from 0.1 to 3%. However, the concentration data for the remaining constituents of the liquid-crystal mixtures, i.e. the liquid-crystalline or mesogenic compounds, are given without taking into account the concentration of these additives.

The physical properties of the liquid-crystal mixtures are given in this application as determined in "Physical Properties of Liquid Crystals", Ed. M. Becker, Merck KGaA, as of Nov. 1997, unless explicitly stated otherwise.

Above and below—unless stated otherwise—all temperatures are given in degrees Celsius and all percentages for compositions are given in per cent by weight, the values for all physical data, including for the response times and viscosities, are based on 20° C., and the response time is given as an average $t_{ave}$ of the switch-on and switch-off times at the operating voltage at which the two individual values are of equal magnitude. The capacitive threshold $V_0$ was determined at 20° C. from dielectric constants.

The shelf life was investigated in five bonded test cells in each case (d·Δn=0.5 μm) at fixed temperatures of 0° C., −10° C., −20° C., −30° C. and −40° C. The cells bonded to one another on both sides with crossed polarizers were assessed visually at intervals of 24 hours. The time for stable storage at the respective temperatures $t_{store}$ (T) was recorded as the final time at which no change was observed in any cell.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is given. In individual cases, the acronym for the parent structure is followed, separated by a hyphen, by a code for the substituents $R^1$, $R^2$, $L^1$ and $L^2$:

| Code for $R^1$, $R^1$, $R^2$, $L^1$, $L^2$ | | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |

-continued

| Code for $R^1$, $R^1$, $R^2$, $L^1$, $L^2$ | | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nN.F.F | $C_nH_{2n+1}$ | CN | F | F |
| nCF$_3$ | $C_nH_{2n+1}$ | CF$_3$ | H | H |
| nOCF$_3$ | $C_nH_{2n+1}$ | OCF$_3$ | H | H |
| nOCF3.F | $C_nH_{2n+1}$ | OCF$_3$ | F | H |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F.F | $C_nH_{2n+1}$ | OCHF$_2$ | F | F |
| nS | $C_nH_{2n+1}$ | NCS | H | H |
| RVsN | $C_rH_{2r+1}$—CH=CH—$C_sH_{2s}$ | CN | H | H |
| REsN | $C_rH_{2r+1}$—O—$C_sH_{2s}$— | CN | H | H |
| nAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |

Preferred mixture components are given in Tables A and B.

The mixtures according to the invention preferably comprise at least one each of two different types of compounds selected from the group of formulae given in Table B.

The mixtures according to the invention particularly preferably comprise at least one each of four different types of compounds selected from the group of formulae given in Tables A and B.

The media according to the invention preferably comprise one or more each of compounds from the group of compounds of the formulae in Table A and one or more compounds from the group of formulae in Table B.

The media according to the invention particularly preferably comprise at least four, in particular five or more, different types of compounds, which are in turn preferably selected from the group of compounds in Tables A and B.

TABLE A

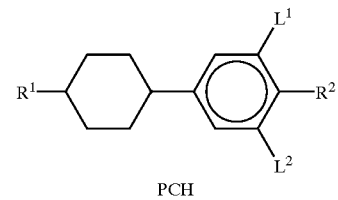

PCH

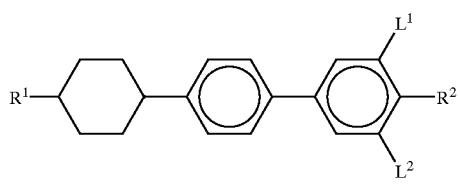

BCH

TABLE A-continued

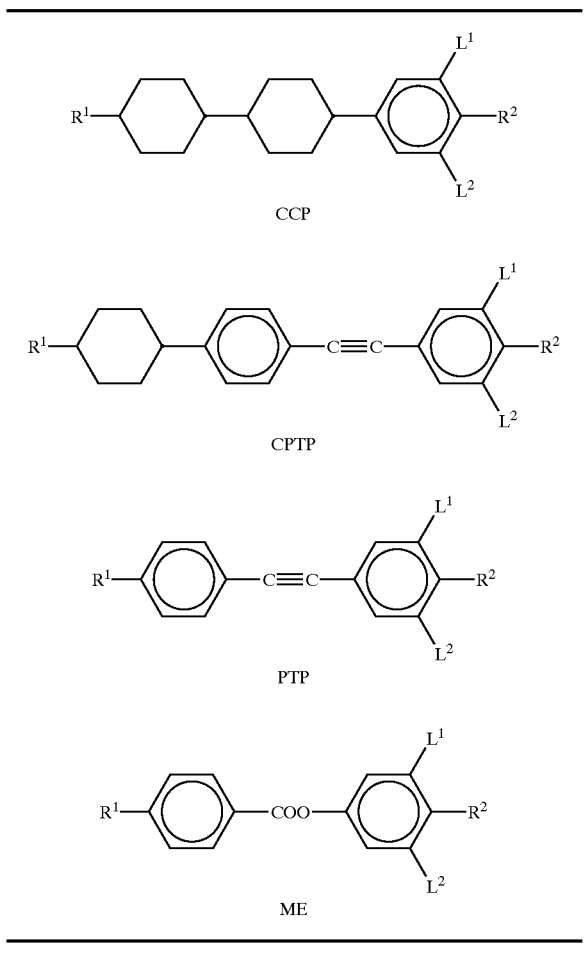

TABLE B

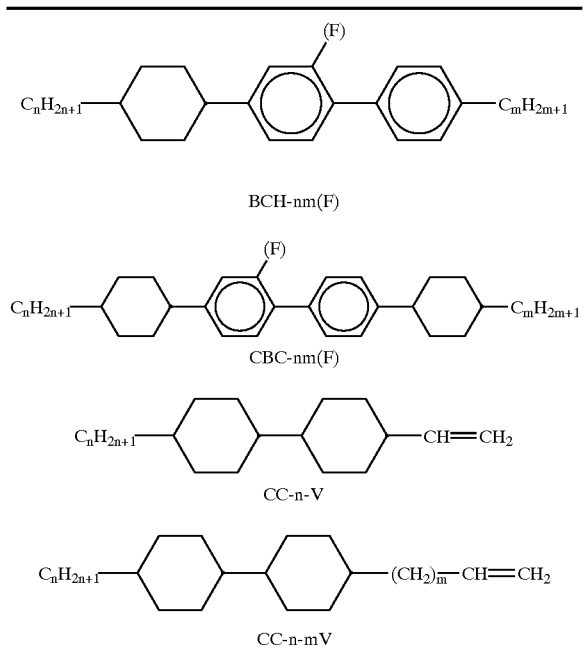

TABLE B-continued

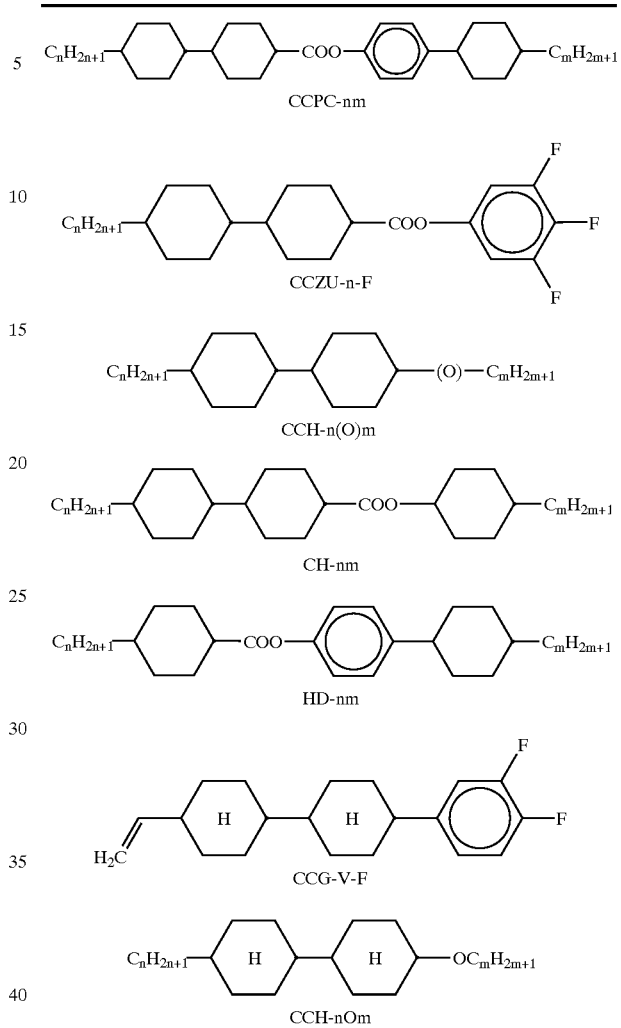

The following abbreviations are used:

| | |
|---|---|
| T(S-N) | Smectic-nematic phase transition temperature |
| T(N-I) | Nematic-isotropic phase transition temperature |
| cl.p. | Clearing point |
| visc. | Rotational viscosity $\gamma_i$ (20° C.) in mPa·s |
| $\Delta\epsilon$ | Dielectric anisotropy (1 kHz, 20° C.) |
| $\Delta n$ | Optical anisotropy (580 nm, 20° C.) |
| steepness | $((V_{90}/V_{10}) - 1) \cdot 100\%$ |
| $v_0$ | Capacitive threshold (20° C.) in V |
| $v_{10}$ | Threshold voltage (= characteristic voltage at a relative contrast of 10% (also abbreviated to $V_{(10,0,20)}$) |
| $V_{90}$ | Characteristic voltage at a relative contrast of 90% |
| $t_{ave}$ | $\dfrac{t_{on} + t_{off}}{2}$ (average response time) |
| $t_{on}$ | Time from switching-on until 90% of the maximum contrast is achieved (including the dead or delay time). |
| $t_{off}$ | Time from switching off until 10% of the maximum contrast is achieved |
| $V_{op}$ | Operating voltage in V |
| d | Layer thickness in $\mu$m |

-continued

| | |
|---|---|
| $k_{11}$ | Elastic constant (splay) |
| $k_{33}$ | Elastic constant (bend) |

BRIEF DESCRIPTION OF THE DRAWINGS

Various other features and attendant advantages of the present invention will be more fully appreciated as the same becomes better understood when considered in conjunction with the accompanying drawings, and wherein.

Figure 1:
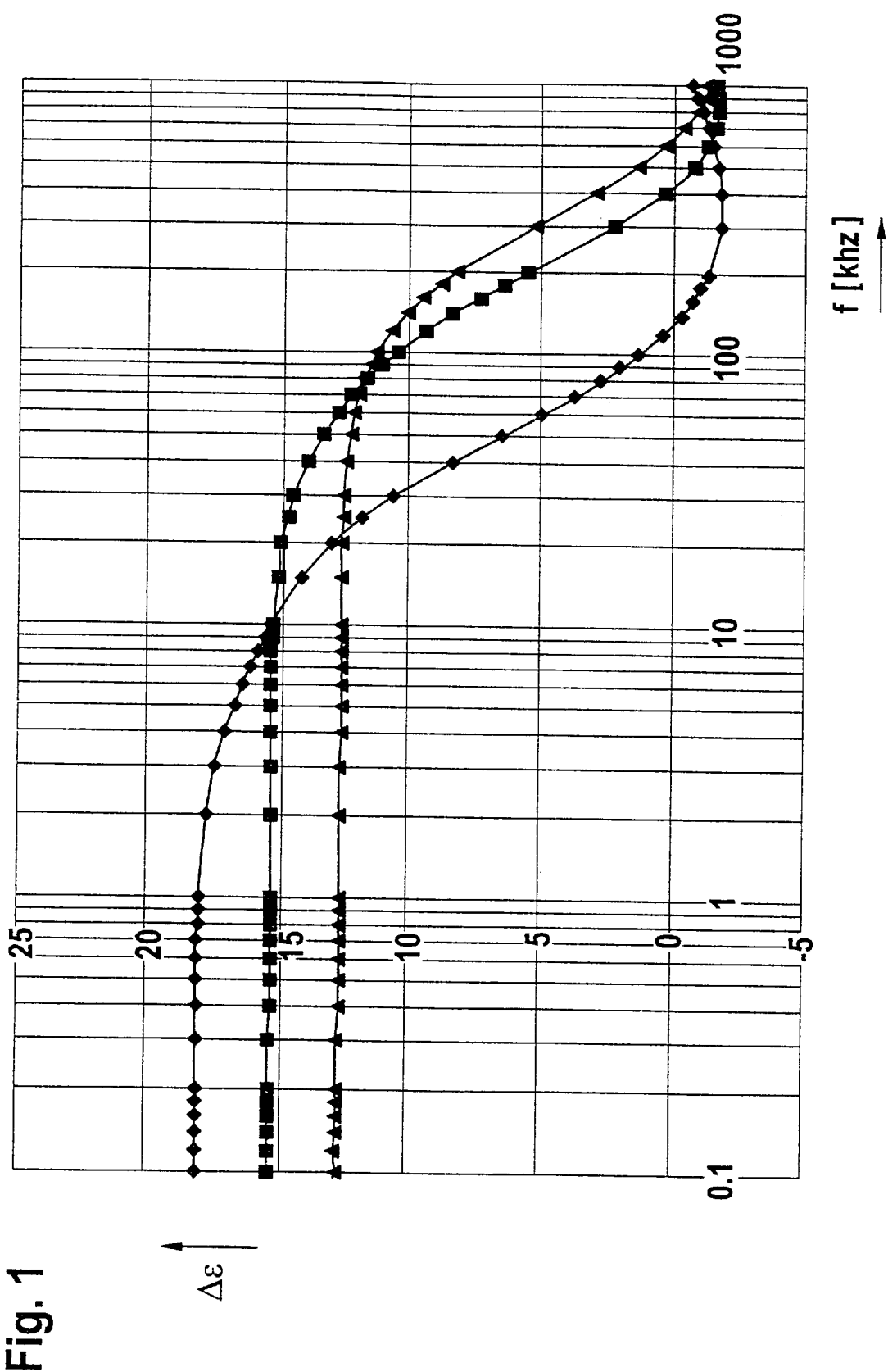
FIG. 1 shows the frequency dependence of $\Delta\in$ for liquid-crystal medium A-1 from Example 1 at various fixed temperatures. The data at 20° C. are represented by the triangles, the data at 0° C. by the squares and the data at −20° C. by the diamonds.

The entire disclosure of all applications, patents and publications, cited above, and of corresponding German patent application Nos. 19841833.7 and 19851513.8, filed Sep. 12, 1998 and Nov. 9, 1998, respectively, are hereby incorporated by reference.

EXAMPLES

The examples below are intended to illustrate the invention without representing a limitation. all temperatures are given in degrees celsius. m.p. denotes melting point, cl.p. or $T_{(N,I)}$ denotes clearing point. $\Delta\in$ denotes the optical anisotropy (589 nm, 20° C.), $\Delta n$ denotes the optical anisotrophy (589 nm, 20° C.), $\Delta\in$ the dielectric anisotrophy (1 kHz, 20° C.), and the viscosity (mm²/sec) was determined at 20° C.

C denotes a crystalline phase, S a smectic phase, $S_c$ a smectic C phase, $S_B$ a smectic B phase, N a nematic phase and I the isotropic phase.

$V_{10}$ denotes the voltage for 10% relative contrast (viewing direction perpendicular to the plate surface). $\Delta n$ denotes the optical anisotropy and $n_o$ the ordinary refractive index, in each case at 589 nm, unless stated otherwise. $\Delta\in$ denotes the dielectric anisotropy ($\Delta\in=\in\|-\in\bot$, where $\in\|$ denotes the dielectric constant parallel to the longitudinal molecular axes and $\in\|$ denotes the dielectric constant perpendicular thereto). $\Delta\in$ is determined at 1 kHz and 20° C., unless expressly stated otherwise. $\gamma_1$ denotes the rotational viscosity, $k_i$ denotes the elastic constants. The rotational viscosity was determined using a calibrated measuring instrument. The value for ZLI-4792 from Merck KGaA at 20° C. was 133 mPa·s. The electro-optical data were measured in a TN cell at the 1st minimum (i.e., at a d·$\Delta n$ value of 0.5 km) at 20° C., unless expressly stated otherwise. All physical properties related to 20° C. and were measured at 20° C., unless expressly stated otherwise. All concentration data, above and below, are given in percent by weight, unless expressly stated otherwise. The storage times $t_{store}$ (T) were determined at fixed temperatures in sealed TN test cells provided with crossed polarizers with d·$\Delta n$=0.5 µm and containing CU-1511 from Du Pont, USA. The stable storage time given was the time at which no change was evident using the eye in any of five test cells.

Example 1

Liquid-crystal mixture A-1 was prepared by a conventional process.

TABLE 1

| Liquid-crystal mixture A-1 | |
|---|---|
| Composition | |
| Compound | Concentration/% |
| PCH-3N.F.F | 10.0 |
| PCH-5N.F.F | 20.0 |
| PCH-302 | 12.0 |
| CCPC-33 | 6.0 |
| CCPC-34 | 6.0 |
| BCH-32 | 8.0 |
| CC-5-V | 10.0 |
| CBC-33 | 2.0 |
| PCH-3 | 11.0 |
| CCZU-3-F | 12.0 |
| PTP-102 | 3.0 |
| | 100.0 |
| Physical properties | |
| $T_{(N,I)}$ | 65.0° C. |
| $T_{store}$ (−30° C.) | >1000 h |
| $\Delta n$ (589 nm, 20° C.) | 0.1009 |
| $N_o$ (589 nm, 20° C.) | 1.4877 |
| $K_1$ (20° C.) | $8.5 \cdot 10^{-12}$ N |
| $K_3/K_1$ (20° C.) | 1.53 |
| $\Delta\epsilon$ (1 kHz, 20° C.) | 12.0 |
| $\Delta_\bot$ (1 kHz, 20° C.) | 5.5 |
| TN(d · $\Delta n$ = 0.50 µm, $\phi$ = 90°) | |
| $V_{10}$ (0°, 20° C.) | 1.03 V |

The frequency dependence of the dielectric constants, in particular of $\Delta\in$, was investigated. The dielectric constants at the three temperatures of 20° C., 0° C. and −20° C. were determined here at addressing voltages of in each case from 0.1 kHz (100 Hz) to 1000 kHz using an HP 4192A LF impedance analyzer from Hewlett Packard, USA, at a voltage of 0.3 V.

The results are shown graphically in FIG. 1. At a given temperature, $\Delta\in$ initially remains constant with increasing frequency, but starts to drop at higher frequencies $\Delta\in$, for example at about 30 kHz at 20° C. (triangles).

At higher frequencies, the negative slope of d$\in$/df initially increases in absolute terms, but drops again after an inflection point (at about 330 Hz at 20° C.). At even higher frequencies, $\Delta\in$ passes through a minimum value, generally with a negative sign, cf. the values for T=−20° C. (diamond), where the minimum is at about 330 kHz.

With falling temperature, $\Delta\in$ on the one hand increases at low frequencies, for example from 12.7 via 15.4 to 18.2 at from 20° C. via 0° C. to −20° C. at 1 kHz.

At lower temperatures, on the other hand, the drop in $\Delta\in$ starts, however, at even lower frequencies. The curves for the various temperatures thus intersect. For example, the curve for 0° C. (squares) cuts the curve for −20° C. (diamonds) at a frequency of 10 kHz.

The characteristic frequency and $\Delta\in$ values are shown in Tables 1 and 2.

TABLE 1

Characteristic frequencies of the media

| Medium | A-1 | A-2 | C-1 |
|---|---|---|---|
| $f_x$(0° C., 20° C.)/Hz | 80 | 80 | 27 |
| $F_x$(−20° C., 0° C.)/Hz | 10 | 11 | 2.1 |
| f (Δε' max, 20° C.) | 330 | 390 | 220 |
| f (Δε' max, 0° C.) | 230 | 250 | 61 |
| f (Δε' max, −20° C.) | 50 | 52 | 5.3 |

TABLE 2

Characteristic dielectric anisotropies of the media

| Medium | A-1 | A-2 | C-1 |
|---|---|---|---|
| Δε(1 kHz, 20° C.) | 12.7 | 12.2 | 14.7 |
| Δε(1 kHz, 0° C.) | 15.4 | 14.8 | 18.1 |
| Δε(1 kHz, −20° C.) | 18.2 | 17.4 | 20.7 |
| Δε(10 kHz, 20° C.) | 12.6 | 12.2 | 14.6 |
| Δε(10 kHz, 0° C.) | 15.3 | 14.6 | 17.4 |
| Δε(10 kHz, −20° C.) | 15.3 | 15.0 | 3.4 |
| Δε(Δε' max, 20° C.) | 5.1 | 5.2 | 6.2 |
| Δε(Δε' max, 0° C.) | 5.4 | 5.5 | 7.6 |
| Δε(Δε' max, −20° C.) | 6.4 | 7.2 | 10.4 |

Example 2

Liquid-crystal mixture A-2 was prepared as described in Example 1.

TABLE 2

Liquid-crystal mixture A-2

| Compound | Concentration/% |
|---|---|
| PCH-3N.F.F | 10.0 |
| PCH-5N.F.F | 20.0 |
| CCPC-33 | 6.0 |
| CCPC-34 | 6.0 |
| BCH-32 | 10.0 |
| CC-5-V | 21.0 |
| PCH-3 | 10.0 |
| CCZU-3-F | 12.0 |
| PTP-102 | 5.0 |
| | 100.0 |

Physical properties

| | |
|---|---|
| $T_{(N,I)}$ | 70.5° C. |
| $T_{store}$ (−30° C.) | >1000 h |
| Δn (589 nm, 20° C.) | 0.1015 |
| $N_o$ (589 nm, 20° C.) | 1.4860 |
| Δε (1 kHz, 20° C.) | 11.8 |
| $\epsilon_\perp$ (1 kHz, 20° C.) | 5.2 |
| $K_1$ (20° C.) | 8.6 · 10$^{-12}$ N |
| $K_3/K_1$ (20° C.) | 1.71 |
| $\gamma_1$ (20° C.) | 118 |
| TN (d · Δn = 0.50 μm, φ = 90°) | |
| $V_{10}$ (0°, 20° C.) | 1.13 V |

Figure 2:
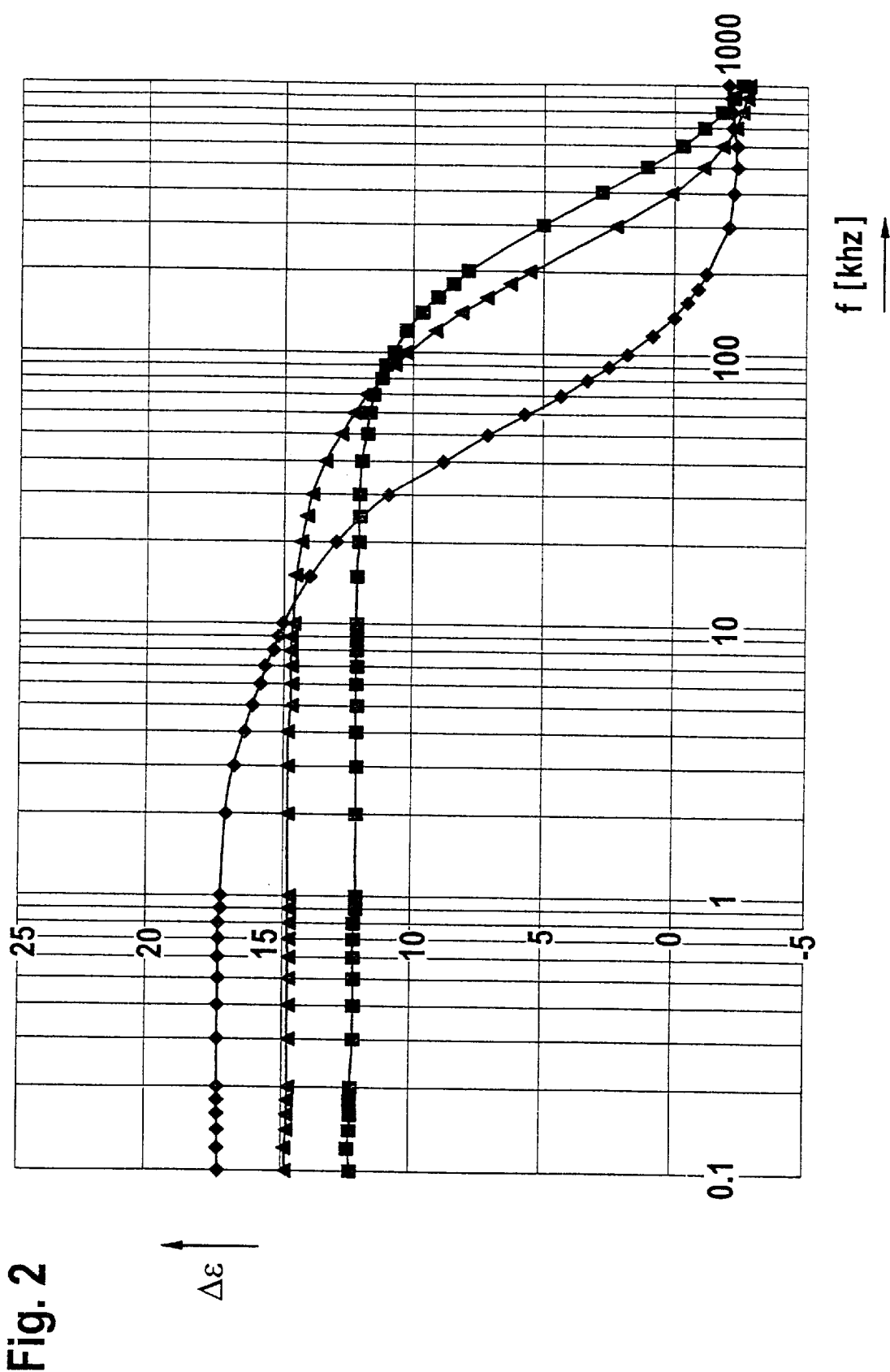
FIG. 2, like FIG. 1, shows the frequency dependence of $\Delta\in$, but now for the liquid-crystal medium A2 from Example 2. The symbols for the following temperatures are as follows: squares for 20° C., triangles for 0° C. and diamonds for −20° C.

As in Example 1, the frequency dependence of the dielectric constants, in particular of Δε, were determined at the temperatures. The results are shown in FIG. 2. The characteristic values are shown in Tables 1 and 2.

On comparison with mixture A-1 of Example 1, it is evident that the reduction in Δε with increasing frequency is shifted to higher frequencies at all temperatures in the case of mixture A-2.

This can be seen from a direct comparison of FIG. 2 with FIG. 1, and is evident correspondingly from the characteristic frequencies. In the case of mixture A-2, not only are all the characteristic values for the reduction in Δε shifted to higher frequencies at the respective temperatures compared with mixture A-1, but also the shift is, in particular, more pronounced at lower temperatures than at higher temperatures. The curves for all temperatures are thus closer together in the case of A-2 than in the case of A-1.

The frequency dependence is thus more similar at the various temperatures.

Comparative Example 1

Liquid-crystal mixture C-1 having the composition shown in the table below was prepared.

TABLE 3

Liquid-crystal mixture C-1

Composition

| Compound | Concentration/% |
|---|---|
| ME2N.F | 3.0 |
| ME3N.F | 3.0 |
| ME4N.F | 5.0 |
| ME5N.F | 11.0 |
| ME7N.F | 11.0 |
| ME10.5 | 6.0 |
| PCH-301 | 10.0 |
| PCH-302 | 3.0 |
| CCH-301 | 8.0 |
| CCH-303 | 11.0 |
| CCPC-33 | 3.0 |
| HD-34 | 7.0 |
| HD-35 | 7.0 |
| CH-33 | 3.0 |
| CH-35 | 3.0 |
| CH-43 | 3.0 |
| CH-45 | 3.0 |
| | 100.0 |

Physical properties

| | |
|---|---|
| $T_{(N,I)}$ | 69° C. |
| $T_{store}$ (−30° C.) | >1000 h |
| Δn (589 nm, 20° C.) | 0.1017 |
| $N_o$ (589 nm, 20° C.) | 1.4876 |
| Δε (1 kHz, 20° C.) | 15.3 |
| $\epsilon_{195}$ (1 kHz, 20° C.) | 6.1 |
| $K_1$ (20° C.) | 9.2 · 10$^{-12}$ N |
| $K_3/K_1$ (20° C.) | 1.42 |
| $\gamma_1$ (20° C.) | 184 |
| TN (d · Δn = 0.50 μm, φ = 90°) | |
| $V_{10}$ (0°, 20° C.) | 1.05 V |

Figure 3:
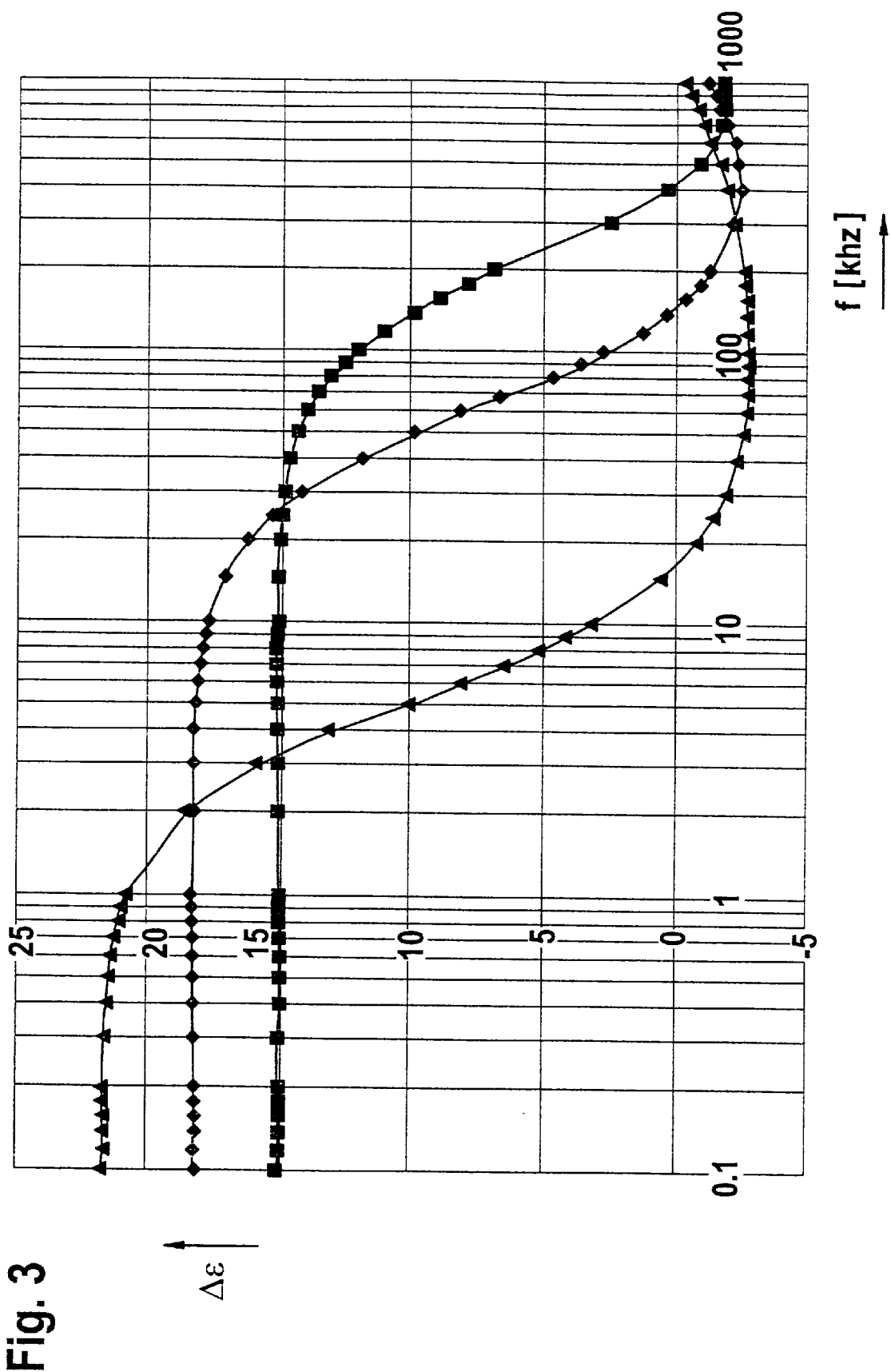
FIG. 3, like FIG. 1, shows the frequency dependence of $\Delta\in$ for the liquid-crystal medium C1 from Comparative Example 1. The symbols for the following temperatures are as follows: squares for 20° C., diamonds for 0° C. and triangles for −20° C.

As in Example 1, the frequency dependence of Δε was determined at three temperatures. The results are shown in FIG. 3 and included in Tables 1 and 2.

In the case of mixture C-1, Δε already starts to deviate from a constant value at about 0.1 kHz (100 kHz) at −20° C.

Compared with both A-1 and A-2, the temperature dependence of Δε is significantly more pronounced in the case of C-1. At all temperatures, the frequency dependence of Δε is greater in the case of C-1 than in the case of A-1 and A-2, i.e. Δε starts to drop at lower frequencies in each case. In addition, the differences from A-1 and A-2 are more pronounced at lower temperatures.

Example 3

Liquid-crystal mixture A-3 was prepared as described in Example 1.

TABLE 4

Liquid-crystal mixture A-3

Composition and properties

| | | | |
|---|---|---|---|
| PCH-3 | 10.0% | Clearing point [° C.]: | +65.5 |
| PCH-3N.F.F | 10.0% | $\Delta\epsilon$ (1 kHz, 20° C.): | +12.4 |
| PCH-5N.F.F | 20.0% | $\Delta n$ (589 nm, 20° C.): | +0.0981 |
| CCG-V-F | 14.0% | $\gamma_1$ [mPa.s] | 140 |
| CCZU-3-F | 10.0% | $K_{11}$ (20° C.) | $7.3 \cdot 10^{-12}$N |
| PCH-302 | 14.0% | $K_{33}$ (20° C.) | $14.7 \cdot 10^{-12}$N |
| BCH-32 | 10.0% | $K_{33}/K_{11}$ (20° C.) | 2.01 |
| CCPC-33 | 6.0% | TN 90° | |
| CCPC-34 | 6.0% | d · $\Delta n$ [$\mu$m]: | 0.50 |
| | | $V_0$ [V]: | 0.81 |

Comparative Example 2

Liquid-crystal mixture C-2 having the composition shown in the table below was prepared.

TABLE 5

Liquid-crystal mixture C-2

Composition and properties

| | | | |
|---|---|---|---|
| ME2N.F | 3.0% | Clearing point [° C.]: | +69 |
| ME3N.F | 3.0% | $\Delta\epsilon$ (1 kHz, 20° C.): | +15.3 |
| ME4N.F | 5.0% | $\Delta n$ (589 nm, 20° C.): | +0.1017 |
| ME5N.F | 11.0% | $\gamma_1$ [mPa.s] | 184 |
| ME7N.F | 11.0% | $K_{11}$ (20° C.) | $9.2 \cdot 10^{-12}$N |
| ME10.5 | 6.0% | $K_{33}$ (20° C.) | $13.0 \cdot 10^{-12}$N |
| PCH-301 | 10.0% | $K_{33}/K_{11}$ (20° C.) | 1.42 |
| PCH-302 | 3.0% | TN 90° | |
| CCH-301 | 8.0% | d · $\Delta n$ [$\mu$m]: | 0.50 |
| CCH-303 | 11.0% | $V_0$ [V]: | 0.86 |
| CCPC-33 | 3.0% | $V_{(10,0,20)}$ [V]: | 1.05 |
| HD-34 | 7.0% | | |
| HD-35 | 7.0% | | |
| CH-33 | 3.0% | | |
| CH-35 | 3.0% | | |
| CH-43 | 3.0% | | |
| CH-45 | 3.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium of positive dielectric anisotropy, comprising: one or more compounds of formula I

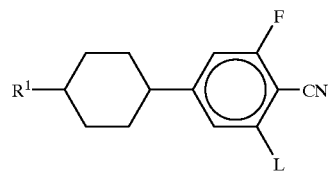

wherein $R^1$ is alkyl or alkoxy having in each case 1 to 12 carbon atoms, or alkenyl, alkoxyalkyl or alkenyloxy having in each case 2 to 12 carbon atoms, and L is H or F; and one or more compounds of formula II

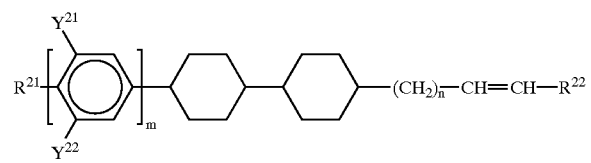

wherein $R^{21}$ is alkyl or alkoxy having in each case 1 to 7 carbon atoms, alkenyl, alkoxyalkyl or alkenyloxy having in each case 2 to 7 carbon atoms, F, Cl, $OCF_3$ or $OCF_2H$, $R^{22}$ is H or alkyl having 1 to 10 carbon atoms, $Y^{21}$ and $Y^{22}$ are each, independently of one another, H or F, n is from 0 to 5, and m is 0 or 1, and said medium having a frequency of the inflection point of $\Delta\epsilon$ as a function of the frequency ($f(\Delta\epsilon'_{max}, T)$ at the temperature of 20° C. of 250 kHz or more, wherein the amount of ester compounds of formulae VIIf and VIIj

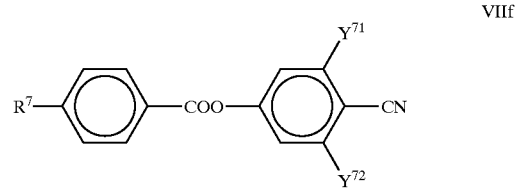

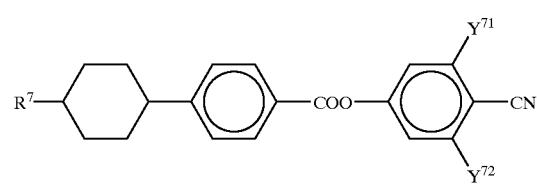

in which $R^7$ is alkyl or alkoxy having 1 to 12 carbon atoms or alkenyl or alkenyloxy having 2 to 12 carbon atoms and $Y^{71}$ and $Y^{72}$ are each independently H or F, is not sufficient to lower said inflection point to less than 250 kHz.

2. A liquid-crystalline medium according to claim 1, wherein said medium contains one or more compounds of formula Ia

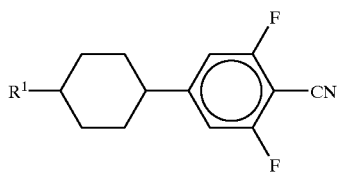

wherein $R^1$ is alkyl having 1 to 12 carbon atoms or alkenyl having 2 to 12 carbon atoms.

3. A liquid-crystalline medium according to claim 1, wherein said medium contains one or more compounds of formula IIa

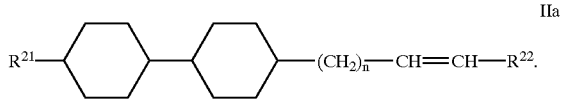

4. A liquid-crystalline medium according to claim 2, wherein said medium contains one or more compounds of formula IIa

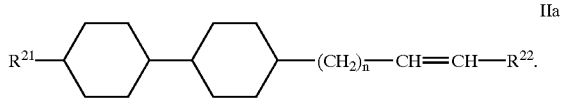

5. A liquid-crystalline medium according to claim 1, wherein said medium contains one or more compounds of formula II, in which $R^{21}$ is alkyl having 1 to 7 carbon atoms or alkenyl having 2 to 7 carbon atoms, $R^{22}$ is H or alkyl having 1 to 3 carbon atoms, and n is 0.

6. A liquid-crystalline medium according to claim 1, wherein said medium contains two or more compounds of the formula I.

7. A liquid-crystalline medium according to claim 2, characterized wherein said medium contains one or more compounds of formula Ia in which $R^1$ is alkenyl having 3 to 5 carbon atoms.

8. A liquid-crystalline medium according to claim 1, wherein said medium contains one or more compounds of formula Ia

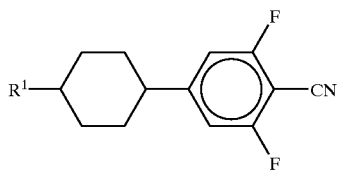

and one or more compounds of formula IIb

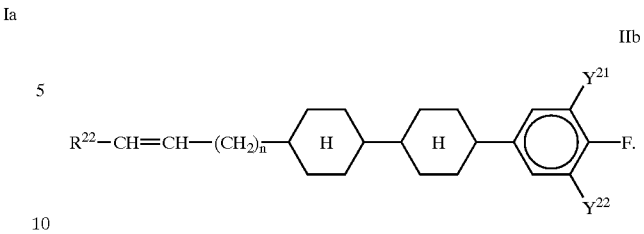

9. A liquid-crystalline medium according to claim 1, further comprising one or more compounds selected from the formulae III to VII:

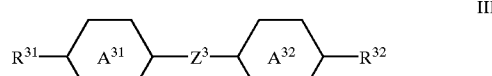

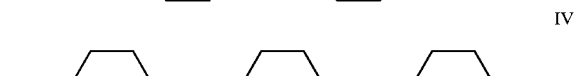

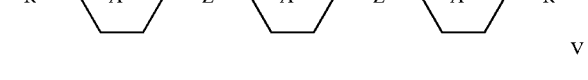

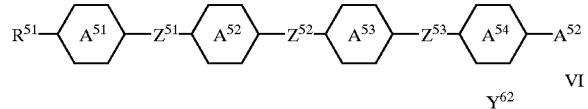

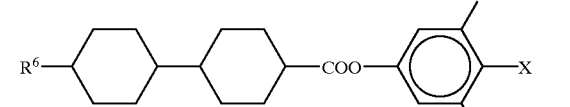

wherein $R^{31}$, $R^{32}$, $R^{41}$, $R^{42}$, $R^{51}$ and $R^{52}$ are each, independently of one another, H, alkyl or alkenyl having 1 to 15 carbon atoms, alkyl or alkenyl having 1 to 15 carbon atoms and which is monosubstituted by CN, $CF_3$ or halogen, wherein in each case one or more $CH_2$ groups in the alkyl or alkenyl radicals is optionally replaced by, in each case independently of one another, —O—, —S—,

—CO—, —CO—O—, —O—CO or —O—CO—O—, in such a way that O atoms are not linked directly to one another;

$A^{31}$, $A^{32}$, $A^{41}$, $A^{42}$, $A^{43}$, $A^{51}$, $A^{52}$, $A^{53}$, $A^{54}$, $A^{71}$ and $A^{72}$ are each, independently of one another, (a) trans-1,4-cyclohexylene, in which, optionally, one or more nonadjacent $CH_2$ groups is replaced by, in each case independently, —O— or —S—, (b) 1,4-phenylene, in which, optionally, one or two CH groups is replaced by N, (c) 1,4-cyclohexenylene, 1,4-bycyclo[2.2.2]octylene, piperidine-1,4-diyl, naphthalene-2,6-diyl, decahydronaphthalene-2,6-diyl or 1,2,3,4-tetrahydronaphthalene-2,6-diyl, where the radicals of group (a) and (b) are unsubstituted or substituted by one or two fluorine atoms;

$Z^3$, $Z^{41}$, $Z^{42}$, $Z^{51}$, $Z^{52}$, $Z^{53}$, $Z^{71}$ and $Z^{72}$ are each, independently of one another, —CO—O—, —O—CO—, —CH$_2$O—, —OCH$_2$—, —CH$_2$CH$_2$—, —CH=CH—, —C≡C— or a single bond, or alternatively —(CH$_2$)$_4$— or —CH=CH—CH$_2$CH$_2$—;

$R^6$ is alkyl having 1 to 7 carbon atoms;

X is F, Cl or OCF$_3$;

$Y^{61}$, $Y^{62}$, $Y^{71}$ and $Y^{72}$ are each independently of one another, H or F;

$R^7$ is alkyl or alkoxy group having 1 to 12 carbon atoms, or alkenyl or alkenyloxy group having 2 to 12 carbon atoms;

$X^7$ is CN, F, Cl, —CF$_3$, —CF$_2$Cl, —CFHCl, —CF$_2$H, —OCF$_3$, —OCF$_2$Cl, —OCFHCl or —OCHF$_2$; and l is 0 or 1.

10. A liquid crystal medium according to claim 9, wherein said medium contains one or more compounds of formulae IIIa–IIIc

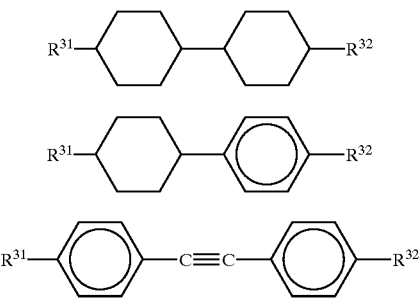

wherein $R^{31}$ and $R^{32}$, independently of one another, are each alkyl or alkoxy having 1 to 7 carbon atoms, or alkenyl, alkenyloxy or alkoxyalkyl having 2 to 7 carbon atoms.

11. A liquid crystal medium according to claim 9, wherein said medium contains one or more compounds of formulae IVa–IVb

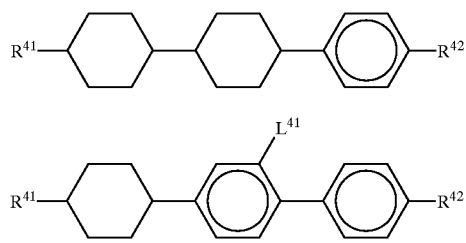

wherein $R^{41}$ and $R^{42}$, independently of one another, are each alkyl or alkoxy having 1 to 7 carbon atoms, or alkenyl, alkenyloxy or alkoxyalkyl having 2 to 7 carbon atoms, and $L^{41}$ is H or F.

12. A liquid crystal medium according to claim 9, wherein said medium contains one or more compounds of formulae Va–Vb

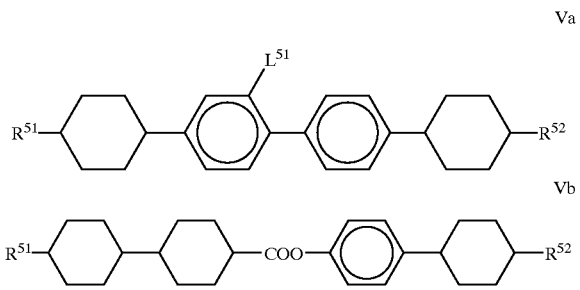

$R^{51}$ and $R^{52}$, independently of one another, are each alkyl or alkkoxy having 1 to 7 carbon atoms, or alkenyl, alkenyloxy or or alkoxyalkyl having 2 to 7 carbon atoms, and $L^{51}$ is H or F.

13. A liquid crystal medium according to claim 9, wherein said medium contains one or more compounds of formulae VIIa–VIIb

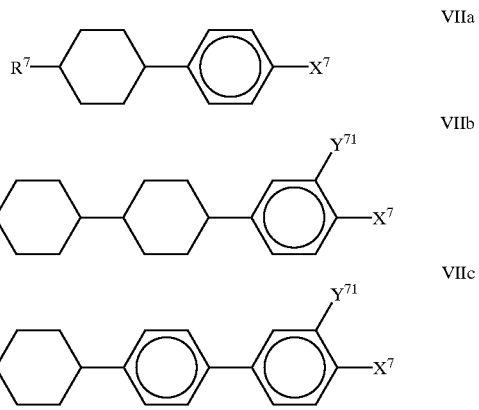

wherein $R^7$ is n-alkyl having 2 to 7 carbon atoms or alkenyl having 2 to 7 carbon atoms, $X^7$ is F or CN, and $Y^{71}$ is H or F.

14. In an electro-optical display element containing a liquid-crystalline medium, the improvement wherein said medium is a medium according to claim 1.

15. In an electro-optical display containing one or more electro-optical display elements, the improvement wherein said display contains at least one display elements according to claim 14.

16. In a method of generating an electro-optical display using one or more electro-optical display elements, the improvement wherein at least one display element according to claim 14 is used to generate said display.

17. A liquid-crystalline medium according to claim 1, wherein said medium has a frequency of the inflection point of $\Delta\epsilon$ as a function of the frequency (f($\Delta\epsilon'_{max}$, T) at the temperature of 20° C. of 330 kHz or more.

18. A liquid-crystalline medium according to claim 17, wherein said medium has a frequency of the inflection point of $\Delta\epsilon$ as a function of the frequency (f($\Delta\epsilon'_{max}$, T) at the temperature of 20° C. of 380 kHz or more.

19. A liquid-crystalline medium of positive dielectric anisotrophy, comprising: one or more compounds of formula I

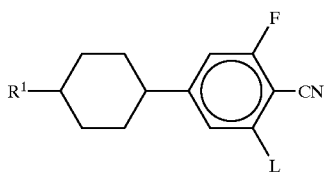

wherein
R$^1$ is alkyl or alkoxy having in each case 1 to 12 carbon atoms, or alkenyl, alkoxyalkyl or alkenyloxy having in each case 2 to 12 carbon atoms, and
L is H or F; and
one or more compounds of formula II

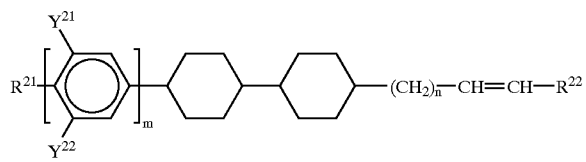

wherein
R$^{21}$ is alkyl or alkoxy having in each case 1 to 7 carbon atoms, alkenyl, alkoxyalkyl or alkenyloxy having in each case 2 to 7 carbon atoms, F, Cl, OCF$_3$ or OCF$_2$H,
R$^{22}$ is H or alkyl having 1 to 10 carbon atoms,
Y$^{21}$ and Y$^{22}$ are each, independently of one another, H or F,
n is from 0 to 5, and
m is 0 or 1, and
said medium having a frequency of the inflection point of $\Delta\in$ as a function of the frequency (f($\Delta\in'_{max}$, T) at a temperature of 0° C. of 80 kHz or more,
wherein the amount of ester compounds of formulae VIIf and VIIj

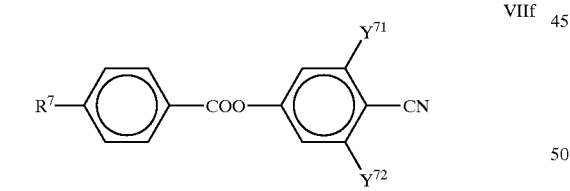

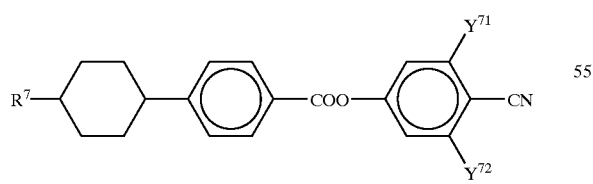

in which R$^7$ is alkyl or alkoxy having 1 to 12 carbon atoms or alkenyl or alkenyloxy having 2 to 12 carbon atoms and Y$^{71}$ and Y$^{72}$ are each independently H or F, is not sufficient to lower said inflection point to less than 80 kHz.

20. A liquid-crystalline medium according to claim 19, wherein said medium has a frequency of the inflection point of $\Delta\in$ as a function of the frequency (f($\Delta\in'_{max}$, T) at a temperature of 0° C. of 160 kHz or more.

21. A liquid-crystalline medium according to claim 20, wherein said medium having a frequency of the inflection point of $\Delta\in$ as a function of the frequency (f($\Delta\in'_{max}$, T) at a temperature of 80° C. of 200 kHz or more.

22. A liquid-crystalline medium according to claim 21, wherein said medium having a frequency of the inflection point of $\Delta\in$ as a function of the frequency (f($\Delta\in'_{max}$, T) at a temperature of 0° C. of 220 kHz or more.

23. A liquid-crystalline medium of positive dielectric anisotrophy, comprising: one or more compounds of formula I

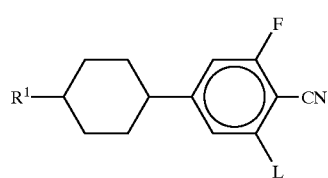

wherein
R$^1$ is alkyl or alkoxy having in each case 1 to 12 carbon atoms, or alkenyl, alkoxyalkyl or alkenyloxy having in each case 2 to 12 carbon atoms, and
L is H or F; and
one or more compounds of formula II

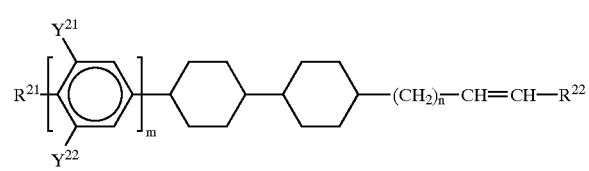

wherein
R$^{21}$ is alkyl or alkoxy having in each case 1 to 7 carbon atoms, alkenyl, alkoxyalkyl or alkenyloxy having in each case 2 to 7 carbon atoms, F, Cl, OCF$_3$ or OCF$_2$H,
R$^{22}$ is H or alkyl having 1 to 10 carbon atoms,
Y$^{21}$ and Y$^{22}$ are each, independently of one another, H or F,
n is from 0 to 5, and
m is 0 or 1, and
said medium having a frequency of the inflection point of $\Delta\in$ as a function of the frequency (f($\Delta\in'_{max}$, T) at a temperature of –20° C. of 10 kHz or more, wherein the amount of ester compounds of formulae VIIf and VIIj

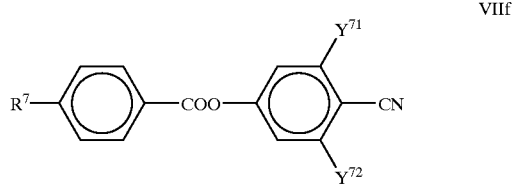

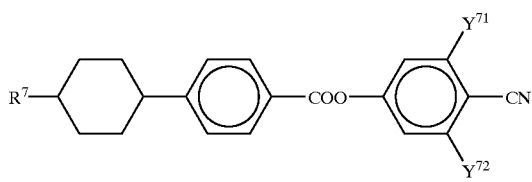

VIIf

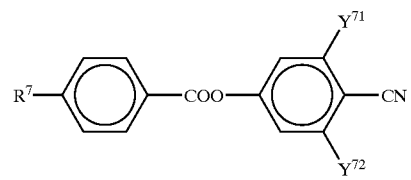

VIIf in which R⁷ is alkyl or alkoxy having 1 to 12 carbon atoms or alkenyl or alkenyloxy having 2 to 12 carbon atoms and $Y^{71}$ and $Y^{72}$ are each independently H or F, is not sufficient to lower said inflection point to less than 10 kHz.

24. A liquid-crystalline medium according to claim 23, wherein said medium has a frequency of the inflection point of $\Delta\varepsilon$ as a function of the frequency ($f(\Delta\varepsilon'_{max}, T)$) at a temperature of −20° C. of 25 kHz or more.

25. A liquid-crystalline medium according to claim 24, wherein said medium has a frequency of the inflection point of $\Delta\varepsilon$ as a function of the frequency ($f(\Delta\varepsilon'_{max}, T)$) at a temperature of −20° C. of 40 kHz or more.

26. A liquid-crystalline medium according to claim 25, wherein said medium has a frequency of the inflection point of $\Delta\varepsilon$ as a function of the frequency ($f(\Delta\varepsilon'_{max}, T)$) at a temperature of −20° C. of 50 kHz or more.

27. A liquid-crystalline medium of positive dielectric anisotrophy, comprising: one or more compounds of formula I

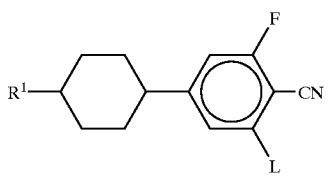

I wherein
R¹ is alkyl or alkoxy having in each case 1 to 12 carbon atoms, or alkenyl, alkoxyalkyl or alkenyloxy having in each case 2 to 12 carbon atoms, and
L is H or F; and
one or more compounds of formula II

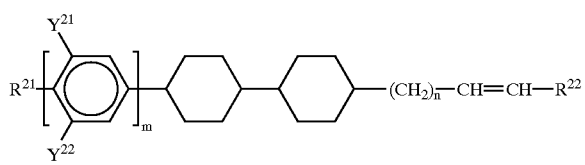

II wherein
$R^{21}$ is alkyl or alkoxy having in each case 1 to 7 carbon atoms, alkenyl, alkoxyalkyl or alkenyloxy having in each case 2 to 7 carbon atoms, F, Cl, OCF₃ or OCF₂H,
$R^{22}$ is H or alkyl having 1 to 10 carbon atoms,
$Y^{21}$ and $Y^{22}$ are each, independently of one another, H or F,
n is from 0 to 5, and
m is 0 or 1, and
said medium having a frequency at which the frequency-dependence curves intersect for given temperatures ($f_x(T_1, T_2)$), for $T_1=0°$ C. and $T_2=20°$ C. ($f_x(0° C., 20° C.)$), is 30 kHz or more, wherein the amount of ester compounds of formulas VIIf and VIIg in which R⁷ is alkyl or alkoxy having 1 to 12 carbon atoms or alkenyl or alkenyloxy having 2 to 12 carbon atoms and $Y^{71}$ and $Y^{72}$ are each independently H or F, is not sufficient to the frequency at the intersect to above 30 kHz.

28. A liquid-crystalline medium according to claim 27, wherein the frequency at which the frequency-dependence curves intersect for given temperatures ($f_x(T_1, T_2)$), for $T_1=0°$ C. and $T_2=20°$ C. ($f_x(0° C., 20° C.)$), is 50 kHz or more.

29. A liquid-crystalline medium according to claim 28, wherein the frequency at which the frequency-dependence curves intersect for given temperatures ($f_x(T_1, T_2)$), for $T_1=0°$ C. and $T_2=20°$ C. ($f_x(0° C., 20° C.)$), is 70 kHz or more.

30. A liquid-crystalline medium according to claim 29, wherein the frequency at which the frequency-dependence curves intersect for given temperatures ($f_x(T_1, T_2)$), for $T_1=0°$ C. and $T_2=20°$ C. ($f_x(0° C., 20° C.)$), is 80 kHz or more.

31. A liquid-crystalline medium of positive dielectric anisotrophy, comprising: one or more compounds of formula I

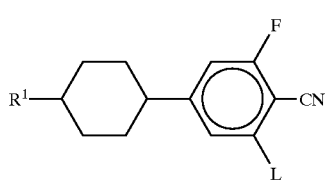

I wherein
R¹ is alkyl or alkoxy having in each case 1 to 12 carbon atoms, or alkenyl, alkoxyalkyl or alkenyloxy having in each case 2 to 12 carbon atoms, and
L is H or F; and
one or more compounds of formula II

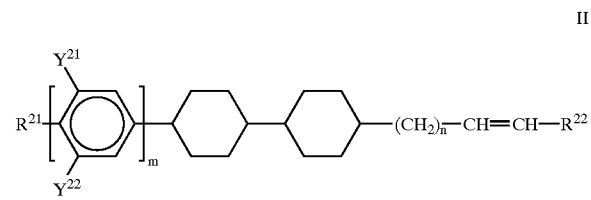

II wherein
$R^{21}$ is alkyl or alkoxy having in each case 1 to 7 carbon atoms, alkenyl, alkoxyalkyl or alkenyloxy having in each case 2 to 7 carbon atoms, F, Cl, OCF₃ or OCF₂H, $R^{22}$ is H or alkyl having 1 to 10 carbon atoms,
$Y^{21}$ and $Y^{22}$ are each, independently of one another, H or F,
n is from 0 to 5, and
m is 0 or 1, and
said medium having a frequency at which the frequency-dependence curves intersect for given temperatures ($f_x(T_1, T_2)$), for $T_1=-20°$ C. and $T_2=0°$ C. ($f_x(-20°$ C., $0°$ C.)), is 4 kHz or more,
wherein the amount of ester compounds of formulas VIIf and VIIg

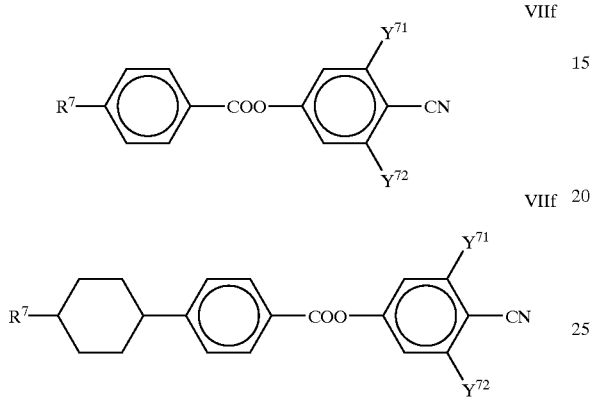

in which $R^7$ is alkyl or alkoxy having 1 to 12 carbon atoms or alkenyl or alkenyloxy having 2 to 12 carbon atoms and $Y^{71}$ and $Y^{72}$ are each independently H or F, is not sufficient to lower the frequency at the intersect to less than 4 kHz.

32. A liquid-crystalline medium according to claim 31, wherein said frequency at which the frequency-dependence curves intersect for given temperatures ($f_x(T_1, T_2)$), for $T_1=-20°$ C. and $T_2=0°$ C. ($f_x(-20°$ C., $0°$ C.)), is 6 kHz or more.

33. A liquid-crystalline medium according to claim 32, wherein said frequency at which the frequency-dependence curves intersect for given temperatures ($f_x(T_1, T_2)$), for $T_1=-20°$ C. and $T_2=0°$ C. ($f_x(-20°$ C., $0°$ C.)), is 8 kHz or more.

34. A liquid-crystalline medium according to claim 33, wherein said frequency at which the frequency-dependence curves intersect for given temperatures ($f_x(T_1, T_2)$), for $T_1=-20°$ C. and $T_2$ of $0°$ C. ($f_x(-20°$ C., $0°$ C.)), is 10 kHz or more.

35. A liquid-crystalline medium of positive dielectric anisotrophy, comprising: one or more compounds of formula I

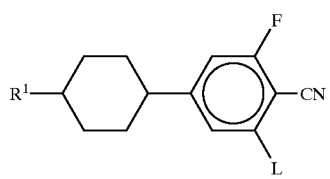

wherein
$R^1$ is alkyl or alkoxy having in each case 1 to 12 carbon atoms, or alkenyl, alkoxyalkyl or alkenyloxy having in each case 2 to 12 carbon atoms, and
L is H or F; and one or more compounds of formula II

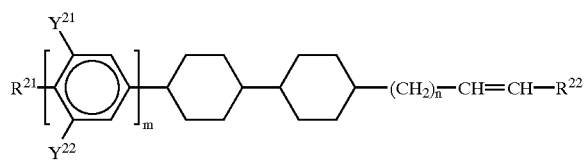

wherein
$R^{21}$ is alkyl or alkoxy having in each case 1 to 7 carbon atoms, alkenyl, alkoxyalkyl or alkenyloxy having in each case 2 to 7 carbon atoms, F, Cl, $OCF_3$ or $OCF_2H$,
$R^{22}$ is H or alkyl having 1 to 10 carbon atoms,
$Y^{21}$ and $Y^{22}$ are each, independently of one another, H or F,
n is from 0 to 5, and
m is 0 or 1, and
wherein the ratio of the frequencies of the inflection points ($f(\Delta\epsilon'_{max}, T_2)/f(\Delta\epsilon'_{max}, T_1)$) at two temperatures, $T_1=0°$ C. and $T_2=20°$ C. ($f(\Delta\epsilon'_{max}, 20°$ C.)/$f(\Delta\epsilon'_{max}, 0°$ C.)), is 3 or less,
wherein the amount of ester compounds of formulas VIIf and VIIg

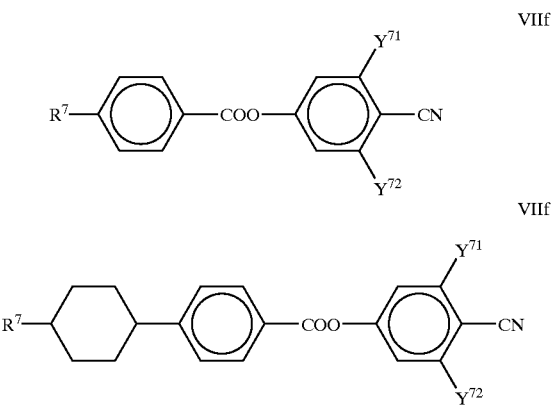

in which $R^7$ is alkyl or alkoxy having 1 to 12 carbon atoms or alkenyl or alkenyloxy having 2 to 12 carbon atoms and $Y^{71}$ and $Y^{72}$ are each independently H or F, is not sufficient to increase said ratio of frequencies to above 3.

36. A liquid-crystalline medium according to claim 35, wherein said ratio of the frequencies of the inflection points ($f(\Delta\epsilon'_{max}, T_2)/f(\Delta\epsilon'_{max}, T_1)$) at two temperatures, $T_1=0°$ C. and $T_2=20°$ C. ($f(\Delta\epsilon'_{max}, 20°$ C.)/$f(\Delta\epsilon'_{max}, 0°$ C.)), is 2 or less.

37. A liquid-crystalline medium according to claim 36, wherein said ratio of the frequencies of the inflection points ($f(\Delta\epsilon'_{max}, T_2)/f(\Delta\epsilon'_{max}, T_1)$) at two temperatures, $T_1=0°$ C. and $T_2=20°$ C. ($f(\Delta\epsilon'_{max}, 20°$ C.)/$f(\Delta\epsilon'_{max}, 0°$ C.)), is 1.7 or less.

38. A liquid-crystalline medium according to claim 37, wherein said ratio of the frequencies of the inflection points ($f(\Delta\epsilon'_{max}, T_2)/f(\Delta\epsilon'_{max}, T_1)$) at two temperatures, $T_1=0°$ C. and $T_2=20°$ C. ($f(\Delta\epsilon'_{max}, 20°$ C.)/$f(\Delta\epsilon'_{max}, 0°$ C.)), is 1.6 or less.

39. A liquid-crystalline medium of positive dielectric anisotrophy, comprising: one or more compounds of formula I

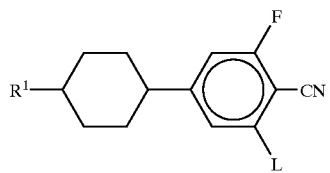

wherein $R^1$ is alkyl or alkoxy having in each case 1 to 12 carbon atoms, or alkenyl, alkoxyalkyl or alkenyloxy having in each case 2 to 12 carbon atoms, and L is H or F; and one or more compounds of formula II

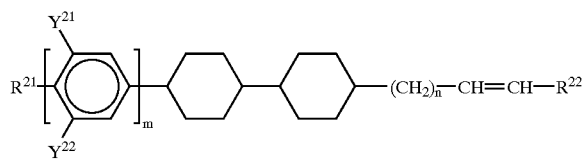

wherein $R^{21}$ is alkyl or alkoxy having in each case 1 to 7 carbon atoms, alkenyl, alkoxyalkyl or alkenyloxy having in each case 2 to 7 carbon atoms, F, Cl, $OCF_3$ or $OCF_2H$, $R^{22}$ is H or alkyl having 1 to 10 carbon atoms, $Y^{21}$ and $Y^{22}$ are each, independently of one another, H or F, n is from 0 to 5, and m is 0 or 1, and wherein the ratio of the frequencies of the inflection points $(f(\Delta\epsilon'_{max}, T_2)/f(\Delta\epsilon'_{max}, T_1))$ at two temperatures, $T_1=-20°$ C. and $T_2=0°$ C. $(f(\Delta\epsilon'_{max}, 0°$ C.$)/f(\Delta\epsilon'_{max}, -20°$ C.$))$, is 10 or less, wherein the amount of ester compounds of formulas VIIf and VIIg

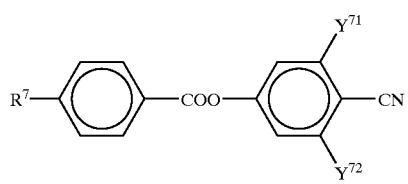

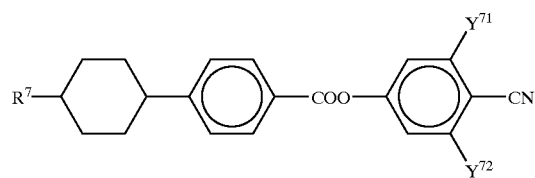

in which $R^7$ is alkyl or alkoxy having 1 to 12 carbon atoms or alkenyl or alkenyloxy having 2 to 12 carbon atoms and $Y^{71}$ and $Y^{72}$ are each independently H or F, is not sufficient to increase said ratio of frequencies to above 10.

40. A liquid-crystalline medium according to claim 39, wherein said ratio of the frequencies of the inflection points $(f(\Delta\epsilon'_{max}, T_2)/f(\Delta\epsilon'_{max}, T_1))$ at two temperatures, $T_1=-20°$ C. and $T_2=0°$ C. $(f(\Delta\epsilon'_{max}, 0°$ C.$)/f(\Delta\epsilon'_{max}, -20°$ C.$))$, is 8 or less.

41. A liquid-crystalline medium taccording to claim 40, wherein said ratio of the frequencies of the inflection points $(f(\Delta\epsilon'_{max}, T_2)/f(\Delta\epsilon'_{max}, T_1))$ at two temperatures, $T_1=-20°$ C. and $T_2=0°$ C. $(f(\Delta\epsilon'_{max}, 0°$ C.$)/f(\Delta\epsilon'_{max}, -20°$ C.$))$, is 6 or less.

42. A liquid-crystalline medium according to claim 41, wherein said a ratio of the frequencies of the inflection points $(f(\Delta\epsilon'_{max}, T_2)/f(\Delta\epsilon'_{max}, T_1))$ at two temperatures, $T_1=-20°$ C. and $T_2=0°$ C. $(f(\Delta\epsilon'_{max}, 0°$ C.$)/f(\Delta\epsilon'_{max}, -20°$ C.$))$, is 5 or less.

43. In an electro-optical display element containing a liquid crystal medium, the improvement wherein said medium is a medium according to claim 19.

44. In an electro-optical display element containing a liquid crystal medium, the improvement wherein said medium is a medium according to claim 23.

45. In an electro-optical display element containing a liquid crystal medium, the improvement wherein said medium is a medium according to claim 27.

46. In an electro-optical display element containing a liquid crystal medium, the improvement wherein said medium is a medium according to claim 31.

47. In an electro-optical display element containing a liquid crystal medium, the improvement wherein said medium is a medium according to claim 35.

48. In an electro-optical display element containing a liquid crystal medium, the improvement wherein said medium is a medium according to claim 39.

* * * * *